Jan. 26, 1965   B. SASSEN ETAL   3,167,000
APPARATUS FOR MANUFACTURE OF COOKED MEAT PRODUCTS
Original Filed April 16, 1959   9 Sheets-Sheet 1

INVENTORS
BERNARD SASSEN
GEORGE D. MYLCHREEST
ALFRED J. KARGL
BY Brown, Doane, Benedikt, Sweckor & Mathis
ATTORNEYS Jan. 26, 1965     B. SASSEN ETAL     3,167,000
APPARATUS FOR MANUFACTURE OF COOKED MEAT PRODUCTS
Original Filed April 16, 1959                       9 Sheets-Sheet 2
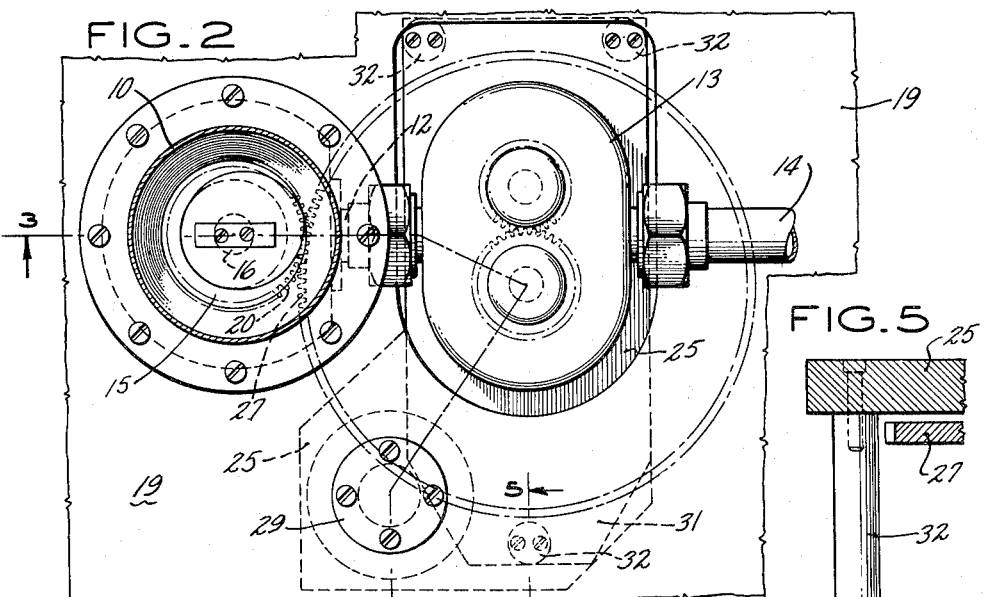
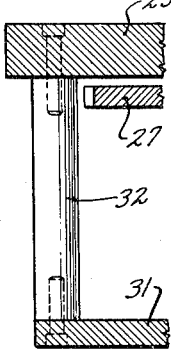
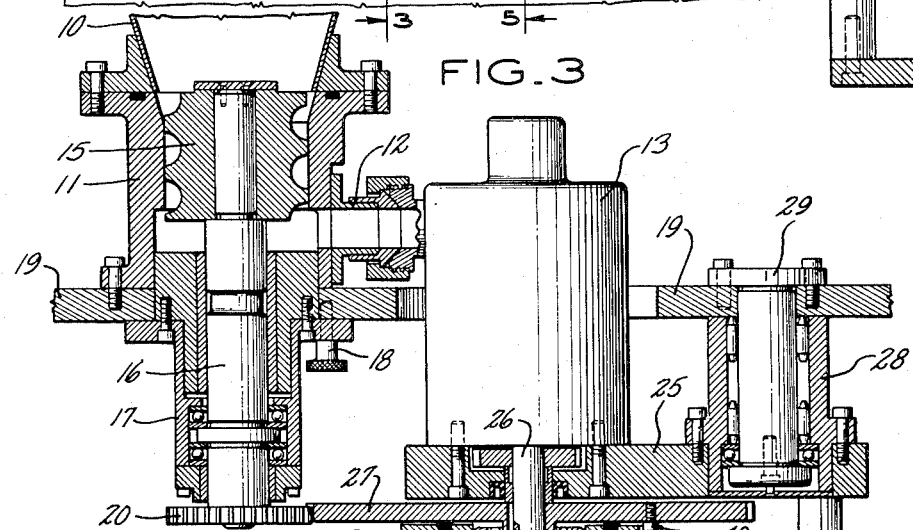
INVENTORS
BERNARD SASSEN
GEORGE D. MYLCHREEST
ALFRED J. KARGL
BY Burns, Doane, Benedict, Swecker & Mathis
ATTORNEYS Jan. 26, 1965  B. SASSEN ETAL  3,167,000
APPARATUS FOR MANUFACTURE OF COOKED MEAT PRODUCTS
Original Filed April 16, 1959  9 Sheets-Sheet 3
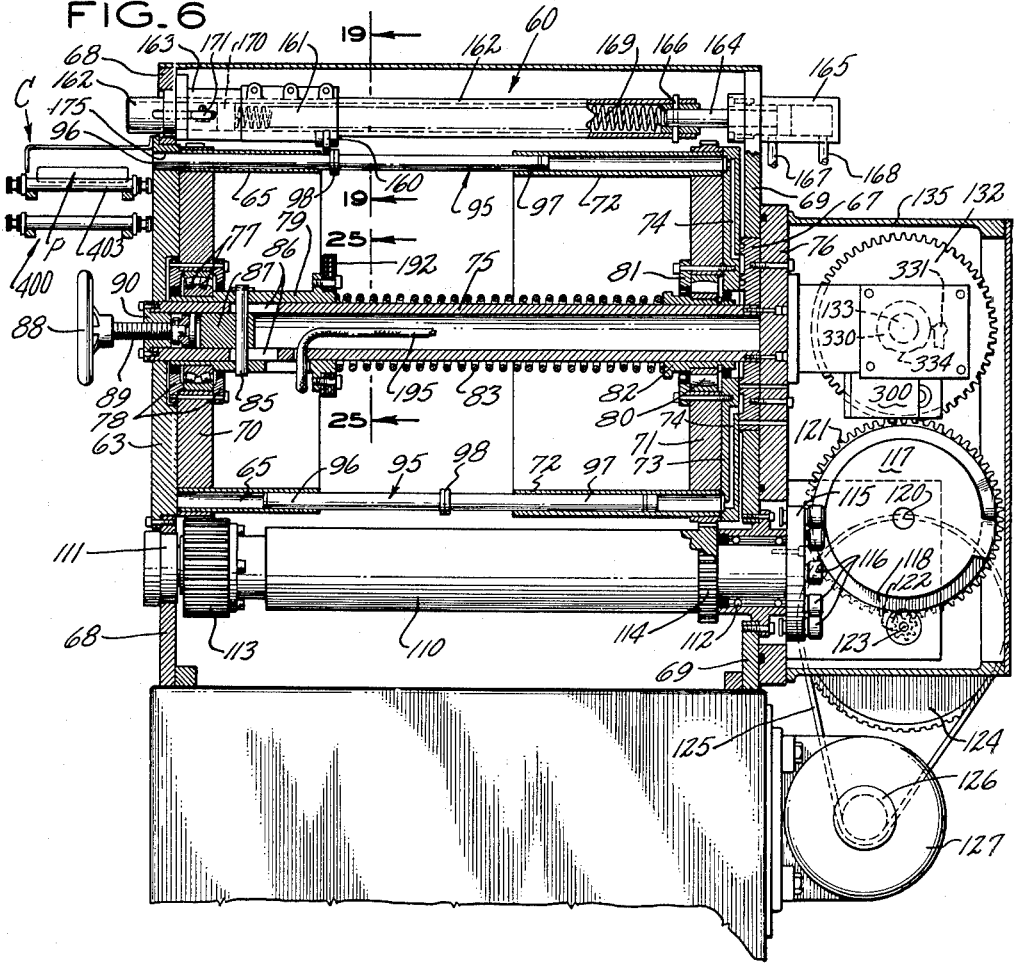
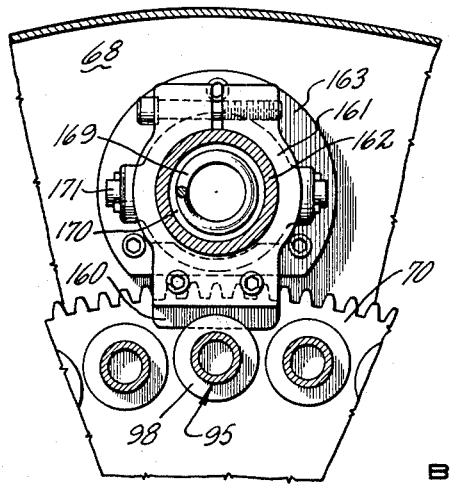
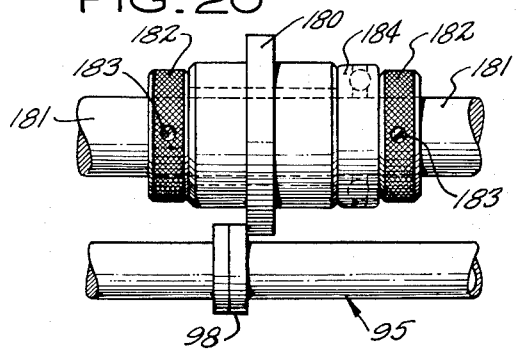
INVENTORS
BERNARD SASSEN
GEORGE D. MYLCHREEST
ALFRED J. KARGL
BY Burns, Doane, Benedict, Swecker & Mathis
ATTORNEYS

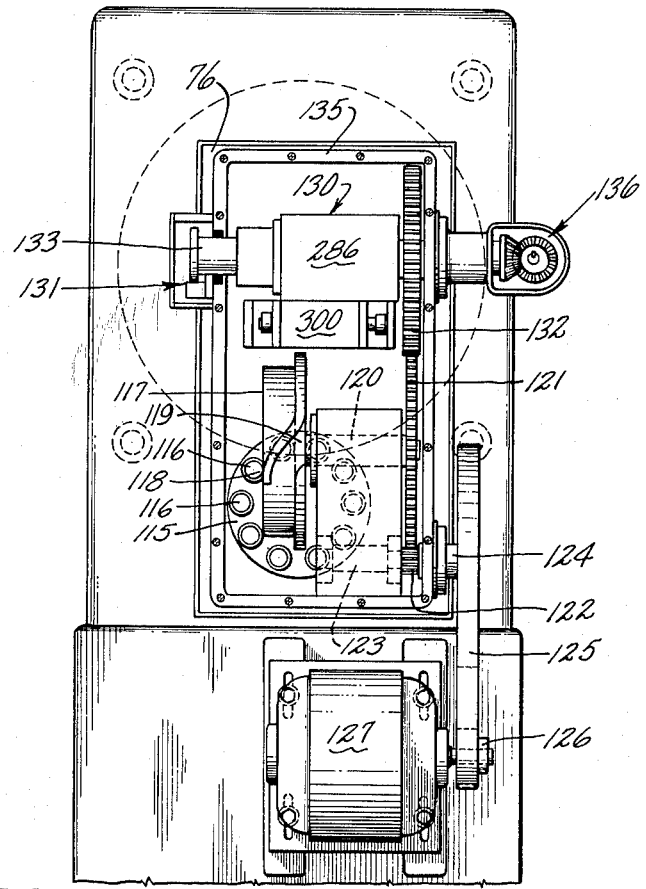
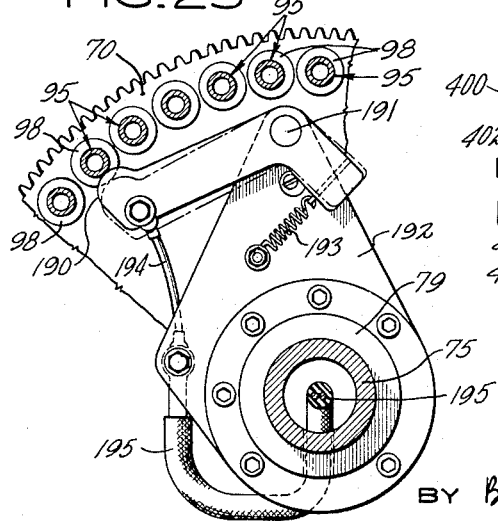
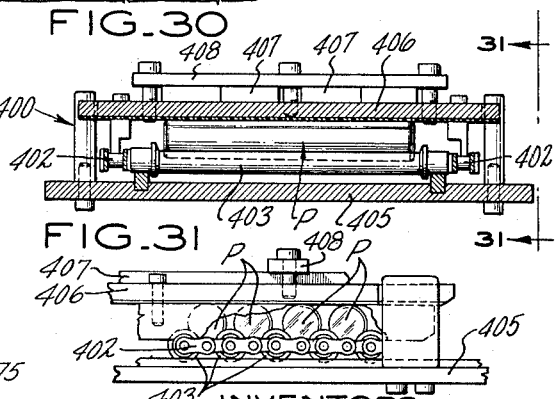
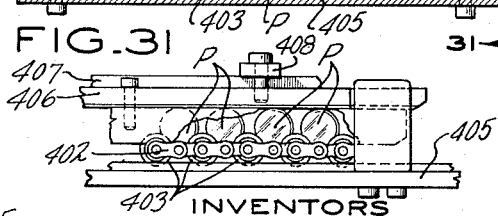

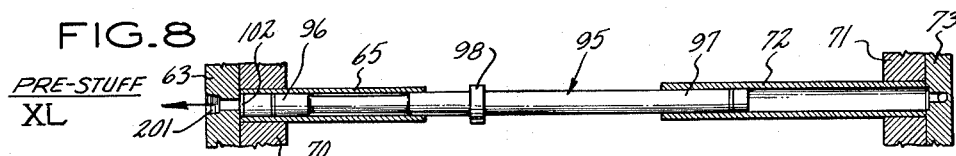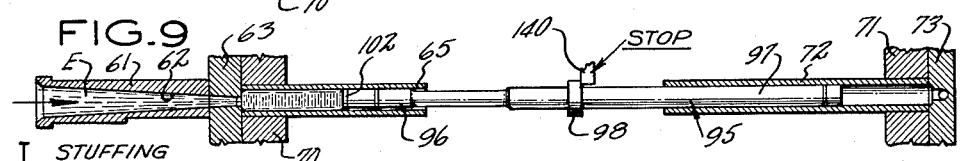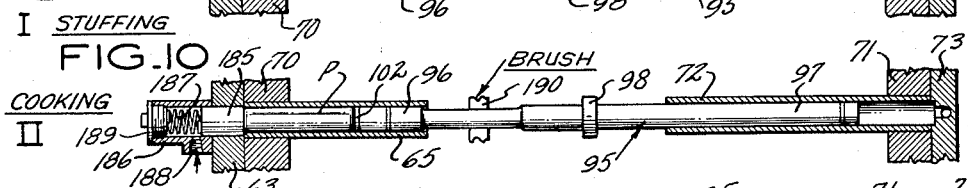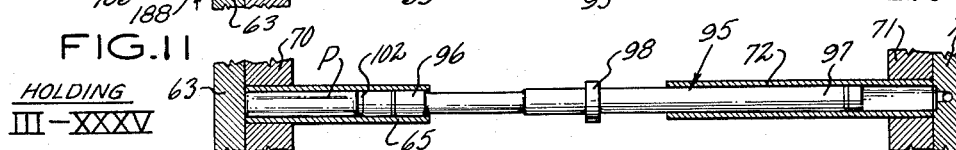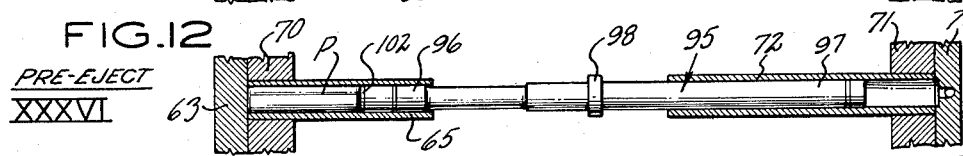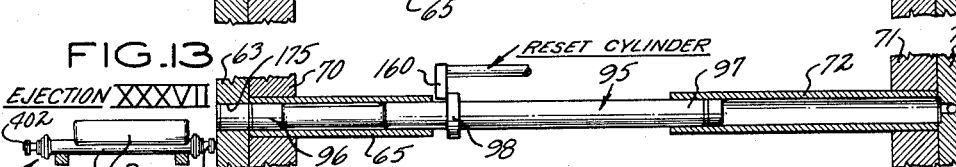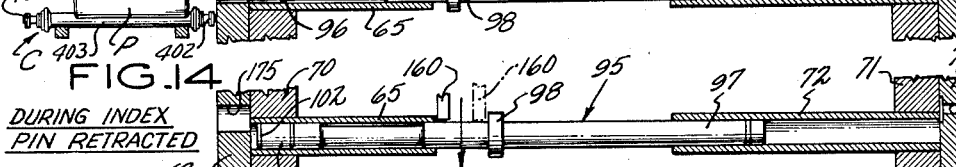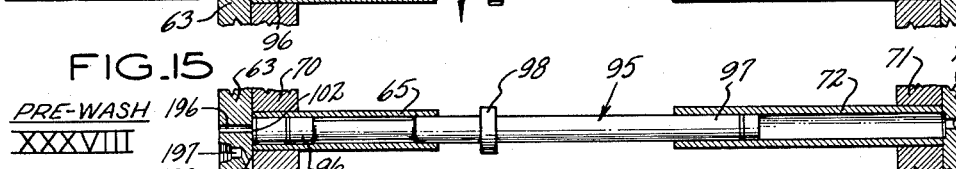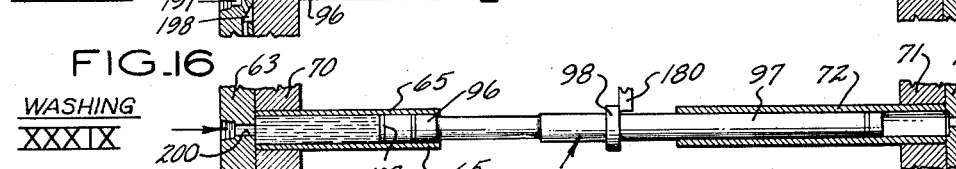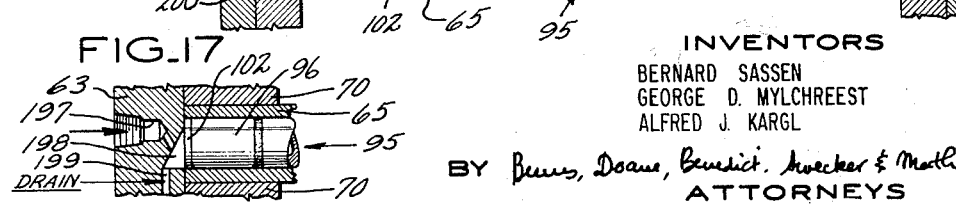

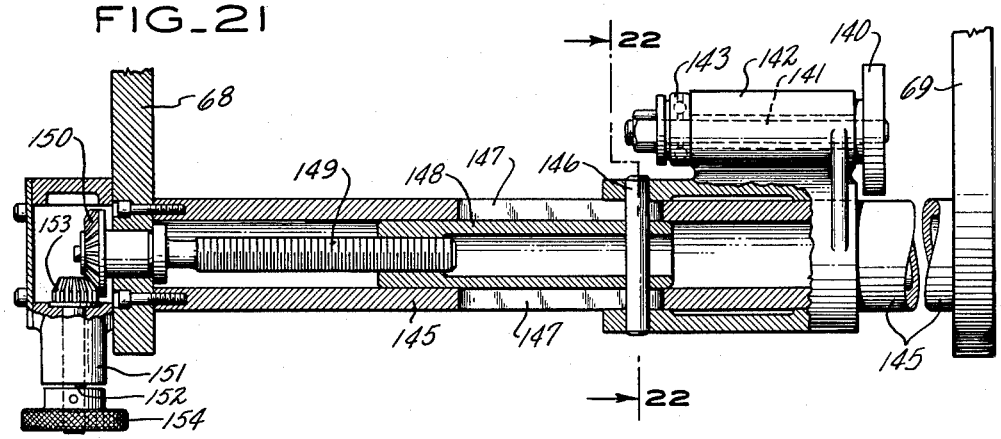
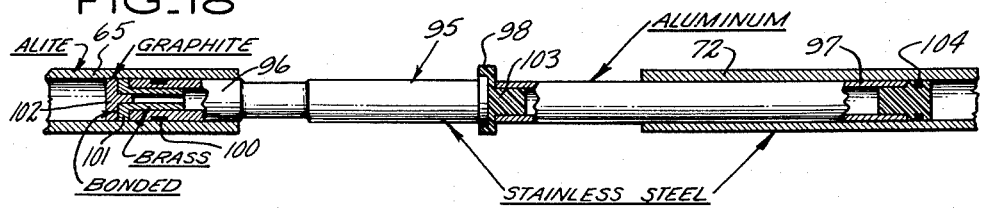
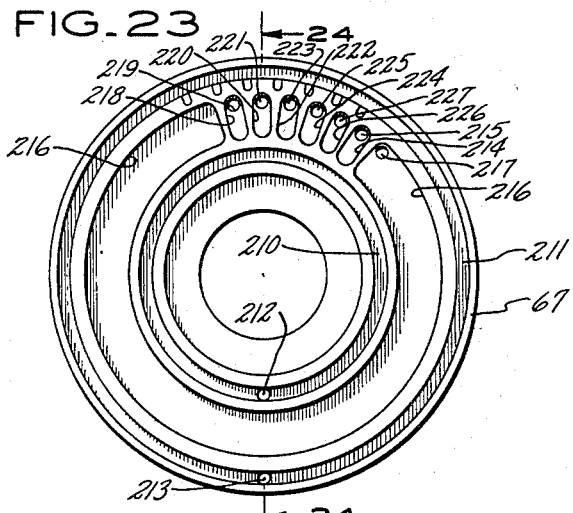
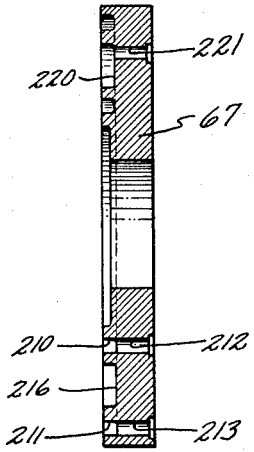
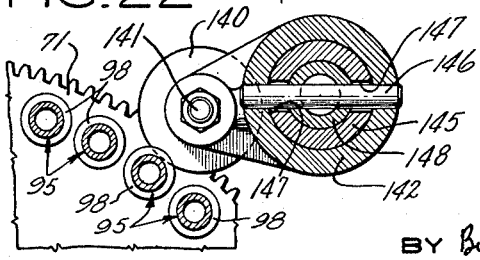

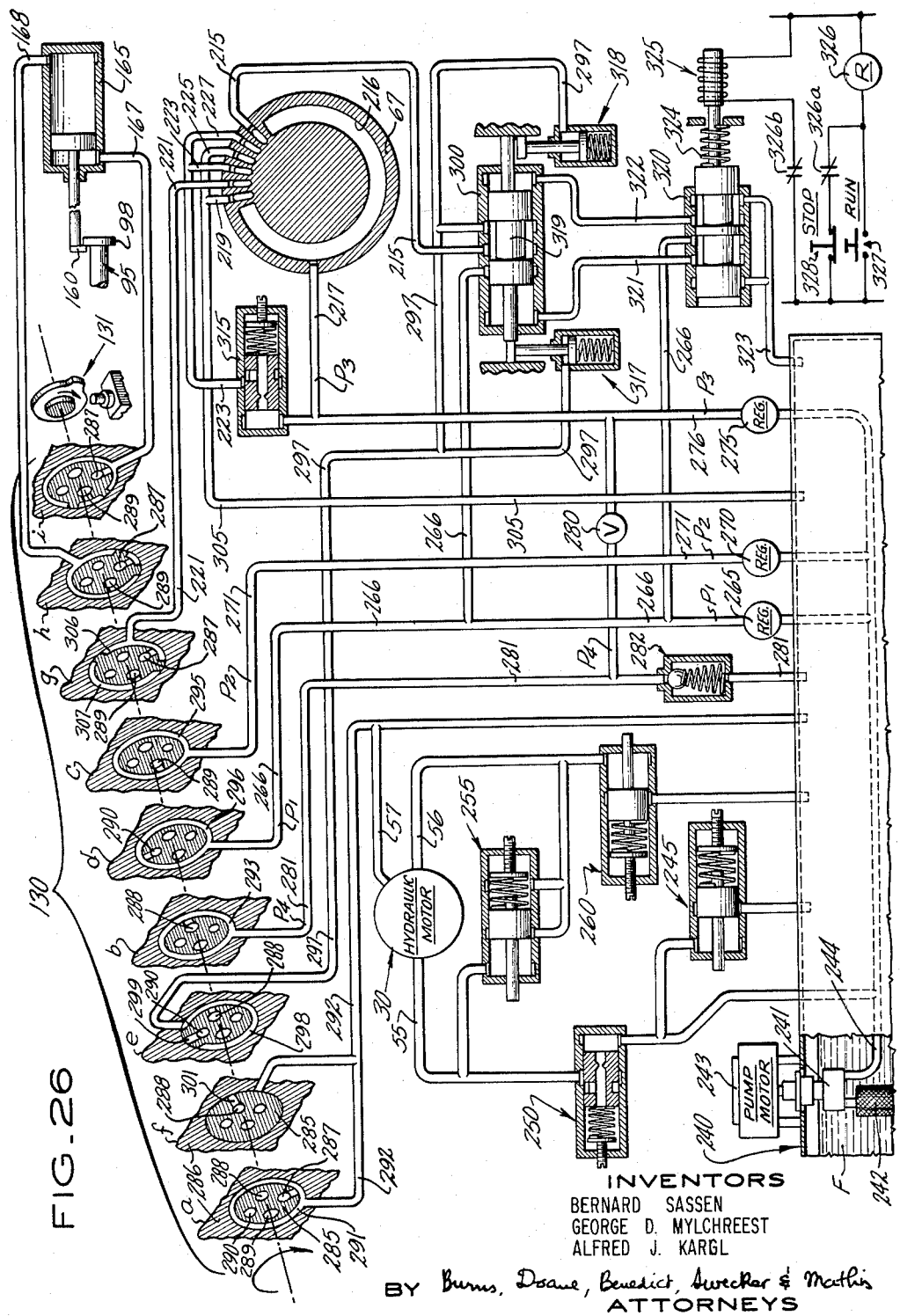

Jan. 26, 1965 B. SASSEN ETAL 3,167,000
APPARATUS FOR MANUFACTURE OF COOKED MEAT PRODUCTS
Original Filed April 16, 1959 9 Sheets-Sheet 9

INVENTORS
BERNARD SASSEN
GEORGE D. MYLCHREEST
ALFRED J. KARGL
BY Burns, Doane, Benedict, Swecker & Mathis
ATTORNEYS 3,167,000
APPARATUS FOR MANUFACTURE OF COOKED MEAT PRODUCTS
Bernard Sassen, George D. Mylchreest, and Alfred J. Kargl, Hartford, Conn., assignors to Emhart Corporation, a corporation of Connecticut
Original application Apr. 16, 1959, Ser. No. 806,936. Divided and this application Mar. 22, 1962, Ser. No. 188,597
10 Claims. (Cl. 99—358)

The instant invention relates to the manufacture of cooked meat products such as sausages that are made from comminuted meat material formed into an elongated or loaf-like shape. In a specific application, the invention is concerned with the production of sausages of the type of the so-called skinless frankfurter. More particularly, the invention as hereinafter set forth relates to an improved process and apparatus for automatic continuous production of cooked sausages such as frankfurters wherein such production can be carried out at a relatively rapid rate in relation to the conventional practices heretofore employed in the production of skinless frankfurters and the like.

For the most part the techniques employed in the art of manufacture of cooked sausages have been known and practiced without material change for many years to make such art an old and established art. Even as applied in the production of the so-called skinless frankfurter the commercial practices have been carried out with relatively little change for upwards of thirty years or so. This is true despite the fact that a number of proposals for modernization and accelerating the frankfurter production process, as it is conventionally practiced, have been made, particularly in recent years.

Common commercial practice in the production of skinless frankfurters has been to fill an animal or artificial casing with an emulsion formed of comminuted meat and water. This step is denoted as the stuffing operation. Then linking is accomplished by twisting the casing at suitable intervals to form the frankfurters of a definite length. Thereafter, the frankfurter is transferred to a smokehouse where it is cured, with the emulsion being contained within the casing, by smoking at a temperature of about 165° F. for a period of from one to four hours. The curing by smoking contributes to the characteristic taste of the product and causes the meat emulsion to change from a semi-fluid condition to a solid and rather tenacious condition, with the proteins in the meat coagulating especially at the surface of the frankfurter, thereby producing a tenacious skin portion. The smoking is followed by removal of the product from the smokehouse and subjecting it to a cooking operation to sterilize the frankfurter and render the product more tender. Thereafter the cellulosic artificial casing is removed from the frankfurter by cutting it open and stripping the casing from the solidified meat. This leaves the frankfurter in the form of a skinless sausage. Where animal casings such as made from sheep intestines are used, such casings are generally left on the product to be eaten as a part of the product. These animal casings are expensive and frankfurters with such casings bring a premium price. For a more complete description of conventional practices used in producing frankfurters, reference may be had to Chapter VIII in "Sausage and Meat Specialties" published by the National Provisioner, 1938.

Performing the hereinabove described conventional practice in the production of skinless frankfurters requires susbtantial time and production space where frankfurter manufacture is being carried out on a sizeable quantity scale, not to mention the labor force required. The time involved in producing a single frankfurter results in tying up a substantial amount of equipment and space where mass product production is desired. The requirement for repeated handling of the product and exposure of the product to possible contamination and bacterial growth by relatively long periods of cooling and exposure of the frankfurters to atmosphere at various stages in the conventional practice creates a real problem calling for utmost care and the most strict sanitary regulations in carrying out frankfurter production. Even then the shelf life of the packaged product is shortened by growth of bacteria resulting from the handling and exposure during manufacture. The necessity for and cost of providing an animal casing which remains on the product or an artificial casing which is discarded after removal from the finished frankfurter adds a cost item which must be computed into the overall cost of the finished product. Additionally, the conventional practice is essentially discontinuous in that batches of the product must be handled such as in the stuffing, smoking, cooking, chilling, etc. stages. Despite these drawbacks the products resulting from these long established conventional practices have a very substantial market demand and arbitrary variation or omission of any of the steps in the conventional practice can have a detrimental effect on the acceptability of the product to the consuming public.

The consuming public has come to demand frankfurters having particular characteristics and in the highly competitive market for such goods, failure to attain these characteristics in one's product puts the producer at a competitive disadvantage. These characteristics include appearance, both as to color and surface smoothness; texture and toughness of the meat which are related along with the skin of the frankfurter to what may be termed the "bite" of the frankfurter; and, of course, taste of the frankfurter. The types of meat used, the manner of preparation and curing of the emulsion, the stuffing, the smoking and the cooking are all factors which variously affect the frankfurter end product, giving to it the desired characteristics depending on how the different steps are combined and carried out in production. Certainly it is not practical to merely discard or arbitrarily modify one or more of these factors since such would involve the risk of producing a commercially unacceptable product. This problem has resulted in a number of proposals for modernization of frankfurter production proving unsatisfactory where the short-cut taken in the proposal for accelerating the frankfurter production process has given a product lacking one or more of the referred to characteristics demanded by the consumer.

In the light of the above, it is a primary object of the instant invention to provide an improved method and apparatus for rapid continuous production of cooked sausages of the so-called skinless frankfurter variety and the like.

A further object is to provide a method for the production of skinless frankfurters and the like which eliminates the prolonged separate smoking and cooking operations carried out in a discontinuous manner as characteristic of prior sausage production techniques and wherein skinless frankfurters and the like fully cooked and ready for packaging may be produced from a meat in water emulsion in a matter of minutes.

Another object of the instant invention is to provide a method in which the total heat input required to completely cook and form each skinless frankfurter and the like is applied in less than one-half second while the product is retained in a mold and wherein substantially all moisture contained in the meat in water emulsion used is retained in the finished product.

Also an object of the invention is to provide a method in which the total heat input requisite to form and cook each skinless frankfurter and the like is applied by passing electrical current through the emulsion for a limited period while the emulsion is maintained at a substantial super atmospheric pressure in a mold obviating the necessity of the expense of a natural or artificial casing and in which the product is maintained under substantial pressure that is released only after a period such that the product has obtained a permanent form.

A further object of the instant invention is to provide an apparatus for continuous automatic production of cooked meat products such as skinless frankfurters and the like enabling rapid production of such products and avoiding the necessity for repeated individual handling of the products in batches with consequent possible contamination thereof.

Another object of the invention is to provide an apparatus for rapid continuous production of cooked meat products such as skinless frankfurters and the like wherein a meat in water emulsion charge is introduced under substantial pressure into successive molds and retained under substantial pressure during cooking and forming of the product into a permanent shape, with the products being successively ejected from the molds and the molds flushed in readiness for receiving another emulsion charge.

It is also an object of this invention to provide an apparatus in accordance with the preceding object wherein the ejected frankfurter is subjected to rolling surface engagement with a heated plate immediately after ejection from the mold to provide desired final product characteristics for the skin surface and color of the frankfurter.

An additional object of this invention is to provide an apparatus operable to automatically carry out the continuous production of cooked meat products such as skinless frankfurters and the like commencing from an emulsion of comminuted meat in water with the apparatus parts entering into the cooking and forming of the products being automatically cleansed after ejection of a product and before receiving an emulsion charge for production of another product.

Another object of the invention is to provide apparatus for continuous automatic production of cooked meat products such as skinless frankfurters and the like commencing from an emulsion of comminuted meat in water wherein cooking is rapidly effected by passing an electric current through an emulsion charge and control is provided to assure proper and substantially uniform temperature increase in successive emulsion charges irrespective of variations in the resistivity of the emulsion forming successive charges.

Other and more specific objects of the instant invention will be readily appreciated and recognized from the description set forth hereinafter pertaining to the method of producing skinless frankfurters and the like of this invention and to a particular embodiment of an apparatus of this invention for producing cooked meat products as, for example, skinless frankfurters and the like.

Before turning to a description of the apparatus illustrated in the drawings and to discussion of specific details of the product production method, a brief summary of the salient features of the invention will be set forth. Briefly, in carrying out the method for producing skinless frankfurters and the like, a predetermined charge of chilled comminuted meat in water emulsion is introduced into a mold. While maintained under substantial pressure within the mold, the charge of emulsion is subjected to an electric current passed through the charge of emulsion to rapidly raise it substantially uniformly throughout to the cooking temperature and thereby cook the product while retained within the mold. The charge of emulsion within the mold is thereafter maintained under substantial pressure for a period until temperature equilibrium and a permanent set for the product is attained. Thereupon the cooked and formed product is ejected from the mold and subjected to a rolling surface engagement with a heated surface to develop desired color and skin surface for the final product.

A preferred form of apparatus operable to perform the method as outlined hereinabove is shown on the drawings. Briefly, this apparatus embodies a hopper for retaining a supply of emulsion connected to the inlet of pump means for pumping the emulsion from the hopper under substantial pressure to a stuffing nozzle. A rotary turret carrying a plurality of tubular molds having plungers associated with such molds is mounted to move the molds in succession past the outlet of the stuffing nozzle to receive a charge of meat in water emulsion to form the product within the mold. The plunger cooperating with each mold operates to admit the emulsion into the mold under a back pressure suitably provided by frictional resistance to rearward movement of the plunger augmented by hydraulic fluid pressure acting against the plunger. Hydraulic fluid pressure is applied and maintained on the rear of the plunger to retain the emulsion under substantial pressure during cooking and holding of the product being produced as the turret is indexed to move the molds successively through the stations disposed around the turret periphery. The cooking is effected by disposing the emulsion charge within each mold between electrodes at a cooking station where an electric current in a single step rapidly heats the emulsion to the desired cooking temperature to fully cook the product. The plunger also is effective to eject the finished product preparatory to the mold again passing into communication with the stuffing nozzle. In the operation of the apparatus as the turret rotates each mold is washed and thereby cooled after ejection of the cooked and formed product and prior to introduction of another emulsion charge.

The rotatably mounted turret is rotated by an indexing drive means through a series of stations so that each mold in succession moves through a stuffing station where the emulsion charge is introduced into the mold, a cooking station and a series of holding stations whereat the product is held under substantial pressure, an ejection station and a washing and cooling station.

The product ejected from each mold is received on a conveyor which transports it in rolling surface engagement with a heated plate to enhance the color and skin surface on the product. Additionally at this stage, drying, chilling and other operations may be performed to prepare the product into its final form for packaging.

These operations are automatically performed and controlled by the apparatus to carry out production from emulsion to end product rapidly and continuously without requiring any intermediate handling.

Whereas the specific apparatus as disclosed herein is particularly designed for use in producing skinless frankfurters, it will be readily recognized that features of the apparatus are effectively adaptable and useable in the production of sausage products in general, including larger items such as Bologna, cooked lunch meats made in loaf form, etc. Thus as used herein in connection with the apparatus description and claims, it is contemplated that in referring to cooked meat products such as sausages and the like, such terminology is considered embracive of sausage products in general.

A more complete understanding of the instant invention may be gained by reference to a detailed description of the invention taken in conjunction with the accompanying drawings. It is to be understood that the drawings are merely illustrative of one apparatus embodying features of the instant invention and suitable for carrying out the method of such invention, and that various modifications and changes in the specific apparatus illustrated as may be envisioned by persons skilled in the art are contemplated within the scope of the appended claims.

In the drawings:

FIGURE 2 is a plan view partly in section taken on line 2—2 of FIGURE 1, illustrating details of the emulsion supply and feeding means.

FIGURE 3 is a sectional view partly in elevation taken on line 3—3 of FIGURE 2.

FIGURE 4 is a sectional view taken on line 4—4 of FIGURE 3.

FIGURE 5 is a detail view taken on line 5—5 of FIGURE 2.

FIGURE 6 is a sectional view with some parts in elevation taken on line 6—6 of FIGURE 1 and illustrating details of the rotary turret and drive means therefor.

FIGURE 7 is a rear elevational view of the apparatus of FIGURE 6 showing the drive means for the turret with the cover on the housing for such drive means removed.

FIGURES 8 through 16 illustrate the positioning and relationship of a mold and its associated plunger at various stages through which each mold and plunger are moved upon indexing rotation of the turret.

FIGURE 17 is a detailed sectional view of the structure providing for cleansing the face of the piston within the mold during indexing movement from the station shown in FIGURE 15.

FIGURE 18 is a detailed view with parts in section showing the structure of the plunger and the pistons at each end thereof cooperating respectively with a tubular mold and hydraulic fluid cylinder.

FIGURE 19 is a sectional view taken on line 19—19 of FIGURE 6 and showing details of the resetting abutment stop used for resetting the plunger following ejection of a product from the mold.

FIGURE 20 is an elevational view showing a fixed stop cooperable with the flange on each plunger to limit retraction of the plunger during washing of the mold.

FIGURE 21 is a sectional view with parts in elevation taken on line 21—21 of FIGURE 1 and showing an adjustable stop for limiting retraction of the plunger to determine the length of the product to be formed in each mold at the stuffing station.

FIGURE 22 is a sectional view taken on line 22—22 of FIGURE 21.

FIGURE 23 is a plan view of the hydraulic fluid pressure distributing plate disposed at the rear end of the rotary turret for distributing proper hydraulic fluid pressure to the turret hydraulic fluid cylinders as the turret is indexed.

FIGURE 24 is a sectional view taken on line 24—24 of FIGURE 23.

FIGURE 25 is a view partly in section taken on line 25—25 of FIGURE 6 and showing the brush contact forming a part of the circuit for electrical cooking of the product.

FIGURE 26 is a schematic diagram of the hydraulic system employed in automatic control of the apparatus.

FIGURE 30 is a sectional view with parts in elevation taken on line 30—30 of FIGURE 1 and showing the conveyor and surface treating plate for receiving the products ejected from the turret, and FIGURE 31 is a side elevational view of a portion of the structure shown in FIGURE 30.

METHOD OF PRODUCING SKINLESS FRANKFURTERS AND THE LIKE

Figure 1:
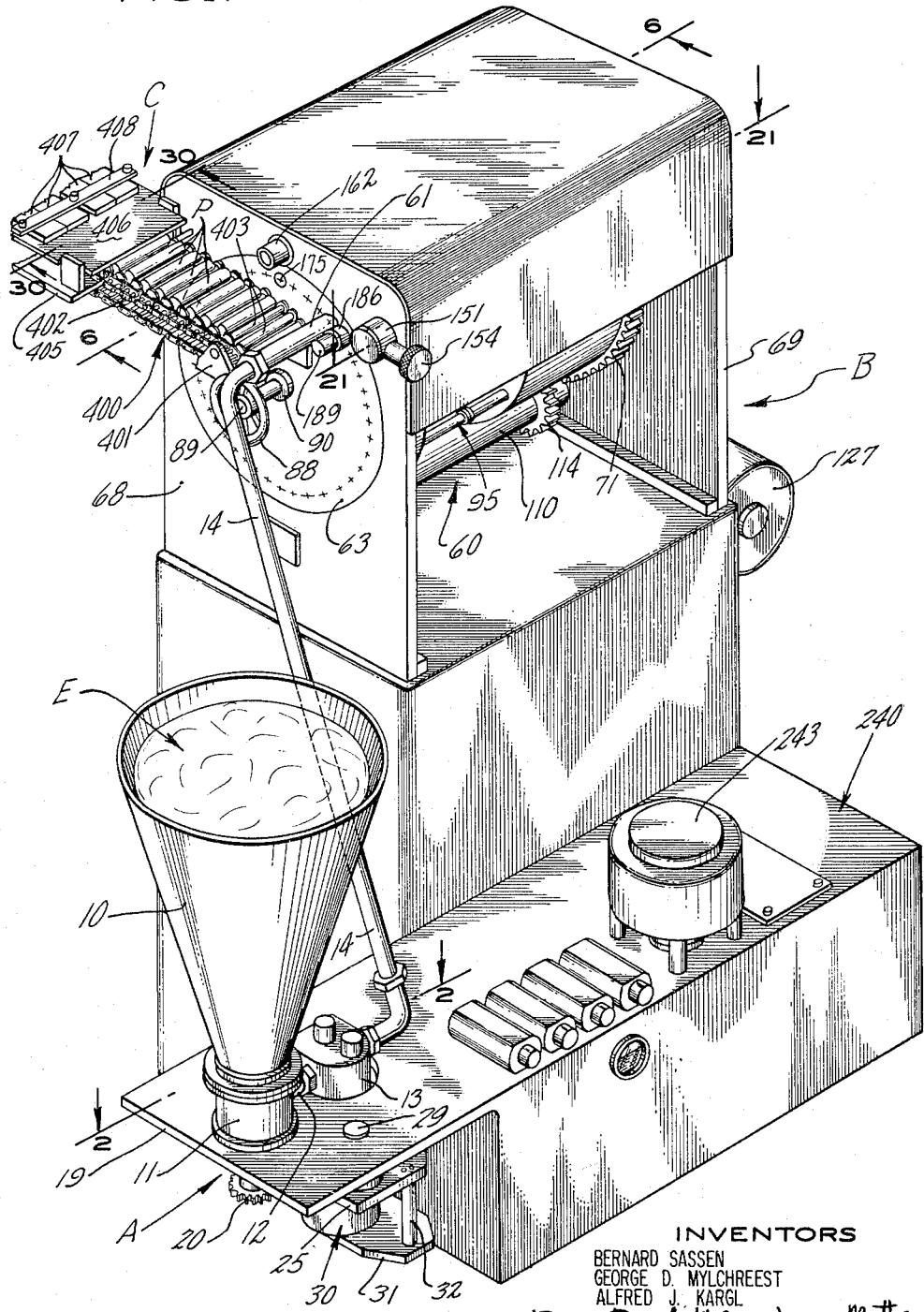
FIGURE 1 is a perspective view of the apparatus of the instant invention.

The method of the instant invention makes possible the continuous rapid production of skinless frankfurters and the like which possess desired characteristics such as color, skin surface and meat texture as required for commercially acceptable products.

The meat in water emulsion employed in carrying out the method of this invention is formed from finely ground meat which generally includes a major portion of beef, a lesser portion of pork and may include some veal. In accordance with usual practice, water or ice is added in preparation of the emulsion. Merely by way of example an emulsion of 85% beef and 15% pork to which is added 18% water or ice (18 pounds water or ice per 100 pounds meat) forms a suitable emulsion, it being understood that appropriate seasoning is included in preparation of the emulsion. Of course, the relative proportions combined in preparing the emulsion may be varied. For more specific discussion and examples of emulsions and their preparation, reference may be had to "Sausage and Meat Specialties" referred to hereinabove.

In carrying out the method of the instant invention, a charge of meat in water emulsion under sufficient pressure to secure a compact solid charge is introduced into a mold. In the stuffing nozzle to mold relationship as described hereinafter, an emulsion pressure of upwards of 120 p.s.i. at the stuffing nozzle has been found to be satisfactory. As a further aspect of this method, the emulsion is chilled to have a temperature of about 50° F. to 55° F. at the inlet to the nozzle. The presence of this temperature of the emulsion at the stuffing nozzle inlet may call for a temperature of around 30° F. to 40° F. for the emulsion supply depending on the temperature rise caused by forced flow of the emulsion through pump means and piping leading from the supply to the stuffing nozzle.

For proper introduction of the emulsion into the mold, a resistance to admission of the emulsion should be provided. Thus, a resistance to admission of emulsion from about 5 p.s.i. to 50 p.s.i. is desirable. Additionally, the inlet orifice from the stuffing nozzle to the mold should have a diameter somewhat less than half the diameter of the mold. For example, for a seven-eighths inch diameter mold, an inlet orifice of three-eighths inch has been found to give optimum results. By conforming to these requirements in introducing the emulsion charge into the mold, the meat fibers in the emulsion through the major portion of the charge within the mold will lie essentially perpendicular to the longitudinal axis of the product, whereas a layer of fibers at the surface of the product will be generally longitudinally aligned parallel to the axis of the product.

It is also important that introduction of emulsion into the mold be effected only when the emulsion orifice is aligned with the mold axis so that the emulsion orifice is concentric with the tubular mold at the point of introduction and that no space exists between the emulsion orifice and the mold plunger within the mold at the time of commencing introduction of emulsion into the mold.

In cooking the emulsion charge disposed within the mold in accordance with the method of this invention, a pressure of at least 50 p.s.i. should be maintained on the emulsion. Preferably a pressure of about 100 p.s.i. or more is used. While maintained under this substantial pressure an electrical current is passed longitudinally through the product between electrodes disposed at opposite ends, such current being continued for a period of between about 1/10 second to about 1/2 second for a product in the order of size of a frankfurter to uniformly raise the temperature of the emulsion in a single step and while retained within the mold to between 150° F. and 200° F. A heating time of about 1/3 second has been used with good results. If a longer heating period is employed, it has been found that the electrodes and to some extent the walls of the mold tend to withdraw heat from the product by conduction resulting in the product ends and surface not being fully heated to the cooking temperature with the consequence of unsuitable products being produced.

Retention of the emulsion under substantial pressure as described above during the heating step has been found to improve the final texture of the meat in the product as well as the surface of the end product. Also employing such a substantial pressure on the emulsion during heating avoids the production of juice and loss of shape for the final product in addition to minimizing channeling of the heating current flowing through the emulsion when high voltages are employed.

It is also important in conjunction with this method that the mold surface be maintained relatively cool, preferably at a temperature slightly above the temperature of the emulsion at the time of its introduction into the mold. The molds should have a low thermal conductivity. Where the molds are permitted to become unduly heated the resistivity of the emulsion adjacent the mold surface is decreased by conduction heating of this portion of the emulsion and channeling of the current through the surface layer of emulsion results such that uniform heating of the product is not achieved.

After cooking, the product, in accordance with the method of this invention, is held under a pressure of at least 50 p.s.i. with 100 p.s.i. or more being preferable. The product is held under this pressure to obtain temperature equilibrium and so that the product will set up to retain the shape of the mold. Additionally the skin surface of the product is improved by this holding under pressure. The holding time may range from between 10 seconds and 60 seconds. Consistent with obtaining an adequately high production rate and a satisfactory end product, a holding time of about 45 seconds appears to be the optimum. It has been determined that a holding time of one minute from initiation of the cooking to relief of the holding pressure is desirable.

After cooking and holding under substantial pressure, the product is ejected from the mold and subjected to rolling surface engagement with a heated surface to improve the color and skin surface of the product. The heated surface may have a temperature of about between 150° F. to 170° F. Additionally, drying by passing heated air across the product to dry the surface may be employed and/or this air may include smoke content to impart a smoky taste to the product. Further, at this stage, if desired a coloring dye at a temperature of about 100° F. to 120° F. may be sprayed onto the product to provide the desired color tone on the surface.

The product is thereafter chilled to be in condition for immediate packaging. It will be appreciated that the entire time from raw emulsion to finished product under the hereinabove described method involves only a matter of minutes and that in the course of carrying out such method at no time is it necessary for the product to be subjected to handling thus minimizing the possibility of contamination as may result from repeated handling necessary under conventional frankfurter production techniques.

GENERAL APPARATUS COMPONENTS

FIGURE 1 of the drawings illustrates in perspective the general overall structure of the apparatus and the relationship between the major components forming the apparatus. These major components may be identified as the emulsion supply and feeding means A, the product forming and cooking machine B and the product surface treatment assembly C.

The details of the emulsion supply and feeding means A are illustrated on the drawings in FIGURES 2 through 5.

The product forming and cooking machine including the various hydraulic controls and electrical circuitry for automatic operation of the apparatus are illustrated in FIGURES 6 through 29.

The product surface treatment assembly is illustrated in FIGURES 30 and 31.

To facilitate description of the structure shown in the various figures on the drawings, the major components as mentioned above will be described separately, followed by a description of the overall operation and functioning of the apparatus.

EMULSION SUPPLY AND FEEDING MEANS A

Referring to FIGURE 1, the emulsion supply and feeding means A includes a hopper 10 to retain a supply of emulsion E. This emulsion is fed from the hopper into a screw pump 11. The outlet 12 from the screw pump feeds into a high pressure positive displacement type emulsion pump 13 which in turn has its outlet connected by pipe 14 to the inlet of the stuffing nozzle discussed hereinafter in conjunction with the product forming and cooking machine. It will be noted that preferably each of the connections between the screw pump 11, emulsion pump 13, pipe 14 and stuffing nozzle are separable union couplings to facilitate disassembly of the parts for thorough cleaning whenever use of the apparatus is discontinued.

Screw pump 11 has a vertical material feed screw 15 mounted on a shaft 16 by bearing means retained in housing 17. This housing is preferably secured by thumb screws 18 to the underside of mounting plate 19 to facilitate removal of the feed screw 15 from the housing of the screw pump for cleaning of emulsion therefrom after use of the apparatus. A gear 20 is fixedly secured to the lower end of shaft 16 for driving the screw pump 11. The screw pump 11 serves to withdraw emulsion from hopper 10 and supply the emulsion at a relatively constant rate to the inlet of the high pressure emulsion pump 13. The provision of screw pump 11 before pump 13 guards against starving the pump 13 and thus has been found to insure a substantially uniform output pressure and feed supply of emulsion at the outlet of pump 13.

The details of the high pressure emulsion pump 13 are not shown on the drawings. Any suitable commercially available pump may be used, it having been found that the sanitary positive displacement type pump model "10BB" as produced by Waukesha Foundry Company of Waukesha, Wisconsin, gives satisfactory results.

The pump 13 is mounted on a support 25 with the pump drive shaft 26 extending downwardly and having keyed thereto a gear 27, which gear drivingly meshes with gear 20 on screw pump 11. The support 25 is pivotally supported by bearing 28 on a pin 29 mounted in and extending downwardly from mounting plate 19. This pivotal mounting of support 25 which carries the pump 13 enables the pump to be moved a limited distance upon disconnection of the union between outlet 12 of screw pump 11 and the intake of pump 13 so that the parts may be thoroughly cleaned whenever use of the apparatus is discontinued.

A hydraulic rotary motor 30 is mounted below and axially aligned with shaft 26 of pump 13. Such motor is carried by a plate 31 suspended from support 25 by three members 32. It will be appreciated that the gear ratio as determined by gears 20 and 27 will determine the relative rotated speed of the feed screw 15 of pump 11 relative to the shaft 26 of pump 13 so that the screw pump can supply emulsion at the desired rate substantially proportional to the speed of pump 13 to avoid starving pump 13.

The rotary motor 30 driven by hydraulic fluid is designed to enable approaching infinite variation of the driven speed of the pump 13. The driving speed of motor 30 may be varied by the rate of supply of hydraulic fluid to the motor and the motor will be stalled at a predetermined output pressure for pump 13 by merely adjusting the pressure at which hydraulic fluid is bypassed around motor 30.

The motor 30 has a casing 35 and a central stator 36, both of which are stationarily secured to plate 31. The stator 36 is provided with passages for conducting hydraulic fluid to and from the chambers in a rotor 37. It will be seen from FIGURES 3 and 4 that the rotor 37 has an annular skirt rotatably supported on central stator 36 and having at its upper end a driving flange 38 provided with a notch 39 with which a stud 40 carried by gear 27 cooperates. To maintain accurate alignment between the central stator 36 and the lower end of shaft 26 of pump 13, a bearing 41 is provided between the hub of gear 27 and a cylindrical recess in the upper end of stator 36.

The casing 35 provides a cavity 45 in which the skirt of rotor 37 rotates. The cavity is divided by a ring 46 having a generally oval interior opening 47 as shown in FIGURE 4. The skirt of rotor 37 has eight radially extending bores 48 in each of which is positioned a ball 49. The radially outward movement of the balls 49 is restrained by the contour of opening 47 in ring 46.

The stator 36 is provided with passages 50 along diametrically opposite sides of the stator and passages 51 also along diametrically opposite sides of the stator but spaced 90 degrees from the location of passages 50 (see FIGURE 4). Referring to FIGURE 3, the passages 50 both communicate through a groove on the exterior of stator 36 with tubing 55 by means of which hydraulic fluid under driving pressure is conducted to drive the motor. Similarly the passages 51 are connected by way of a groove on the exterior of stator 36 with tubing 56 which conducts hydraulic fluid away from the hydraulic motor at a relief pressure lower than the driving pressure. Tubing 57 is connected by a passage within casing 35 to communicate with the cavity 45 to drain off any hydraulic fluid which may escape between the bores 48 within the rotor and the balls 49 within such bores.

Referring to FIGURE 4, the driving action of the motor 30 may be readily understood. With high pressure driving hydraulic fluid introduced through tubing 55, this pressure is communicated through passages 50 to the radially inner surfaces of the balls 49 disposed outwardly in these passages. In the position shown the balls radially outwardly from passages 50 are thereby pressed against the perimeter of opening 47 in ring 46. This outward pressure tends to move the balls toward the major diameter of opening 47. Since the balls are engaged in the bores 48 in rotor 37, the rotor is carried along, moving in a counterclockwise direction as shown by the arrows on FIGURE 6. At this time the balls 49 disposed radially outwardly from passages 51 will move inwardly by reason of their engagement with the perimeter of opening 47, this inward movement being permitted by forcing the hydraulic fluid out through passages 51 and tubing 56. Again referring to FIGURE 4 it will be noted that the chambers between stator 36 and the balls 49 which are disposed horizontally and vertically in the figure are not in communication with either passages 50 or 51. However, as rotor 37 moves counterclockwise the balls disposed vertically in FIGURE 4 will come into communication with high pressure fluid in passages 50, whereas the horizontally disposed balls in this figure will move into communication with passages 51, whereupon the fluid behind these latter mentioned balls may be expelled through passages 51 as the balls are moved inwardly by the contour of opening 47.

As the rotor 37 rotates in response to the application of hydraulic fluid pressure driving torque is transmitted through flange 38, notch 39 and stud 40 to rotate gear 27 and in turn gear 20. It will thus be seen that the emulsion will be withdrawn from hopper 10 by screw pump 11 and supplied to the inlet of positive displacement pump 13 where it is pumped at a substantial outlet pressure through pipe 14 to the stuffing nozzle.

PRODUCT FORMING AND COOKING MACHINE B

Turret structure

As generally shown on FIGURE 1, the product forming and cooking machine embodies a turret 60 rotatably mounted on a horizontal axis. The pipe 14 conducting the meat in water emulsion from the emulsion pump 13 is connected to the inlet of a stuffing nozzle 61 having a tapering bore 62 as shown in FIGURE 9. Nozzle 61 extends through the front plate 63 of the machine to communicate with individual tubular molds 65 carried by the turret as they are moved upon turret rotation past the outlet of the stuffing nozzle.

The form of the stuffing nozzle 61 is shown in FIGURE 9. It will be seen that from the inlet end of this nozzle the cross-sectional area tapers to a minimum cross-sectional area adjacent the inlet to the molds 65 carried by the turret. Thus the cross-sectional area at the outlet of the nozzle is substantially smaller than the cross-sectional area of the interior of the mold. Although a full description of the introduction of an emulsion charge into the mold will be described in connection with the general overall operation, it may be mentioned in passing that the plunger cooperating with the mold is retained by hydraulic pressure on its rear end against admission of any emulsion into the mold until the mold has been moved by full index of the turret to be aligned with the outlet of stuffing nozzle 61. Thereupon this retaining hydraulic pressure is diminished and the emulsion charge is admitted with a predetermined resistance created by frictional resistance to rearward movement of the plunger and by maintaining back pressure on the rear of the plunger. By way of example, for a product having an approximate diameter of ⅞ inch, it has been found that the stuffing nozzle outlet should be ⅜ inch. With an outlet less than ¼ inch, excessive wire drawing of the emulsion occurs.

This method of charging the mold results in the fibers within the emulsion throughout the body of the product being largely disposed transversely to the axis of the product with fibers at the surface of the product extending more or less parallel to the axis of the product. This has been found to be advantageous in that the final product is less susceptible to dimensional changes and/or curling about its longitudinal axis when subjected to heating before eating.

The turret 60 and its principal structural details are best shown in FIGURE 6. It is mounted between a stationary front plate 63 and the stationary back plate 67, these two plates being respectively carried on front and rear supports 68 and 69. The front plate serves as a wear plate which may be removed for cleaning, repair and replacement while the back plate provides for hydraulic fluid distribution to appropriately actuate the plungers carried by the turret.

The front section of the turret includes an annular ring 70 which supports a series of tubular molds 65. The rear section of the turret includes an annular ring 71 which has mounted around the periphery thereof a series of hydraulic fluid cylinders 72. These cylinders correspond in number with the tubular molds 65 and each cylinder is axially aligned with one of the molds 65 on the front section. An annular member 73 is connected to overlay the rear face of ring 71 and is provided with a passage 74 communicating with each of the cylinders 72. These passages extend radially inwardly and terminate in ports spaced around the circumference of a circle to communicate with recesses formed in the abutting face of the stationary back plate 67. The formation of these recesses and their function will be described later by reference to FIGURES 23, 24 and 26 on the drawings.

A hollow shaft 75 is mounted extending horizontally between the front and back plates 63 and 67, the rear end of such shaft being secured to plate 67 and support 69 by plate 76. The front section of the turret is rotatably mounted on shaft 75 by means of a suitable anti-friction bearing 77 with the outer race clamped to the inner perimeter of ring 70 by clamp rings 78 and the inner race mounted on a sleeve 79 engaged with shaft 75.

The rear section is also rotatably mounted on shaft 75 by means of anti-friction bearing 80 with the outer race thereof secured to the inner periphery of ring 71 by clamp ring 81 connected to member 73 and the inner race secured to sleeve 82 slidably supported on shaft 75. A coil spring 83 is disposed between the ends of sleeves 79 and 82 to press the two sleeves axially apart and thereby urge the respective front and rear sections of the turret into sealing engagement with the front plate 63 and back plate 67 respectively. It will thus be seen that spring 83 serves to retain ring 70 in sealing engagement with front plate 63 so that leakage will not occur between the forward ends of molds 65 and the abutting surface of plate 63. Similarly, ring 71 and member 73 connected thereto are urged rearwardly so that the passages 74 sealingly cooperate with the various recesses in plate 67. To provide increased sealing between plates 63 and 67 and the abutting portion on the turret, the force of spring 83 may be augmented or replaced by a hydraulic piston-cylinder assembly disposed between rings 70 and 71.

Means are provided to facilitate disassembly of the apparatus by moving the front and rear turret sections together to compress spring 83 so that front plate 63 may be removed. This means includes a pin 85 extending diametrically of sleeve 79 through elongated slots 86 formed in shaft 75 and engaged with block 87 slidably supported within shaft 75. A hand wheel 88 for rotating a screw 89 is provided extending outwardly of the end of shaft 75 and threadably engaged with plug 90 affixed to the end of such shaft. The inner end of screw 89 engages against block 87 so that rotation of the screw by hand wheel 88 will cause movement of block 87 and sleeve 79 connected thereto by pin 85 inwardly along shaft 75. This action will compress spring 83 and relieve the pressure urging ring 70 against plate 63 so that such plate may be removed for cleaning and servicing as may be necessary.

As has been noted, the front and rear sections of the turret are essentially independent of each other, being urged apart by the coil spring 83. The ring 70 of the front section carries the series of molds 65 spaced around a circle adjacent the periphery of the ring. Ring 71 of the rear section carries a series of cylinders 72 corresponding in number to the molds 65 and spaced on the circumference of a circle corresponding in diameter to the circle around which the tubular molds 65 are disposed so that such cylinders may be axially aligned with one of the molds.

A plunger 95 is provided for each paired mold 65 and cylinder 72. Each plunger has at one end a piston 96 slidably engaging with one of the tubular molds 65 and at the opposite end a piston 97 slidably engaging with one of the cylinders 72. Each piston 97 cooperates with a cylinder 72 to define a chamber into which hydraulic fluid may be introduced under pressure to affect the desired movements of the plunger in operation of the apparatus. Each plunger 95 is provided with an annular flange 98 engageable to limit axial movement of the plunger by suitable stop means provided at certain turret stations as hereinafter described. The functioning and scheduling of operation of the plungers will be described in detail hereinafter.

FIGURE 18 illustrates details of the structure of one of the plungers 95, particularly with respect to the structure of the pistons 96 and 97 which cooperate respectively with a mold 65 and a cylinder 72. It may be noted at this point that in conjunction with electrical cooking of the product as employed in the method and apparatus of this invention, the molds 65 are made of dielectric material to be non-conductive and additionally preferably a poor heat conductor. The piston 96 is constructed to form one electrode for the cooking, with the other electrode being disposed at the opposite end of the mold mounted in plate 63 and grounded to the machine. Thus, the "hot" electrode is formed on piston 96 and is safely enclosed within the machine while the rest of the machine is grounded to reduce the possibility of electrical shock hazard for operators of the apparatus.

Piston 96 may be suitably formed of stainless steel with a diameter essentially corresponding to the inner diameter of the tubular mold 65 to snugly engage with the mold made of dielectric material. A rubber seal ring 100 is provided in an annular groove in piston 96 to seal against leakage of material between the piston and the mold wall. A brass bushing 101 is seated in the end of piston 96 and has bonded to the outer end thereof a disc 102 which may be suitably made of nickel or graphite impregnated with silver to form the electrode employed in the product cooking operation.

The piston 97 at the other end of plunger 95 is electrically insulated from piston 96 by an insulating bushing 103 which provides the flange 98 as shown more clearly in FIGURE 18. The outer end of piston 97 is provided with a rubber seal ring 104 to seal against leakage of hydraulic fluid between the exterior of the piston and interior wall of cylinder 72 with which the cylinder cooperates.

Returning to the illustration of the forming and cooking machine in FIGURE 6, it will be appreciated that the front and rear sections are retained with corresponding molds 65 aligned with cylinders 72 by the plungers 95 engaged with each of these paired molds and cylinders. Additionally, the alignment of the paired molds and cylinders is retained by the rotative drive means for rotating the turret which will be described later.

Turret stations

Figure 27:
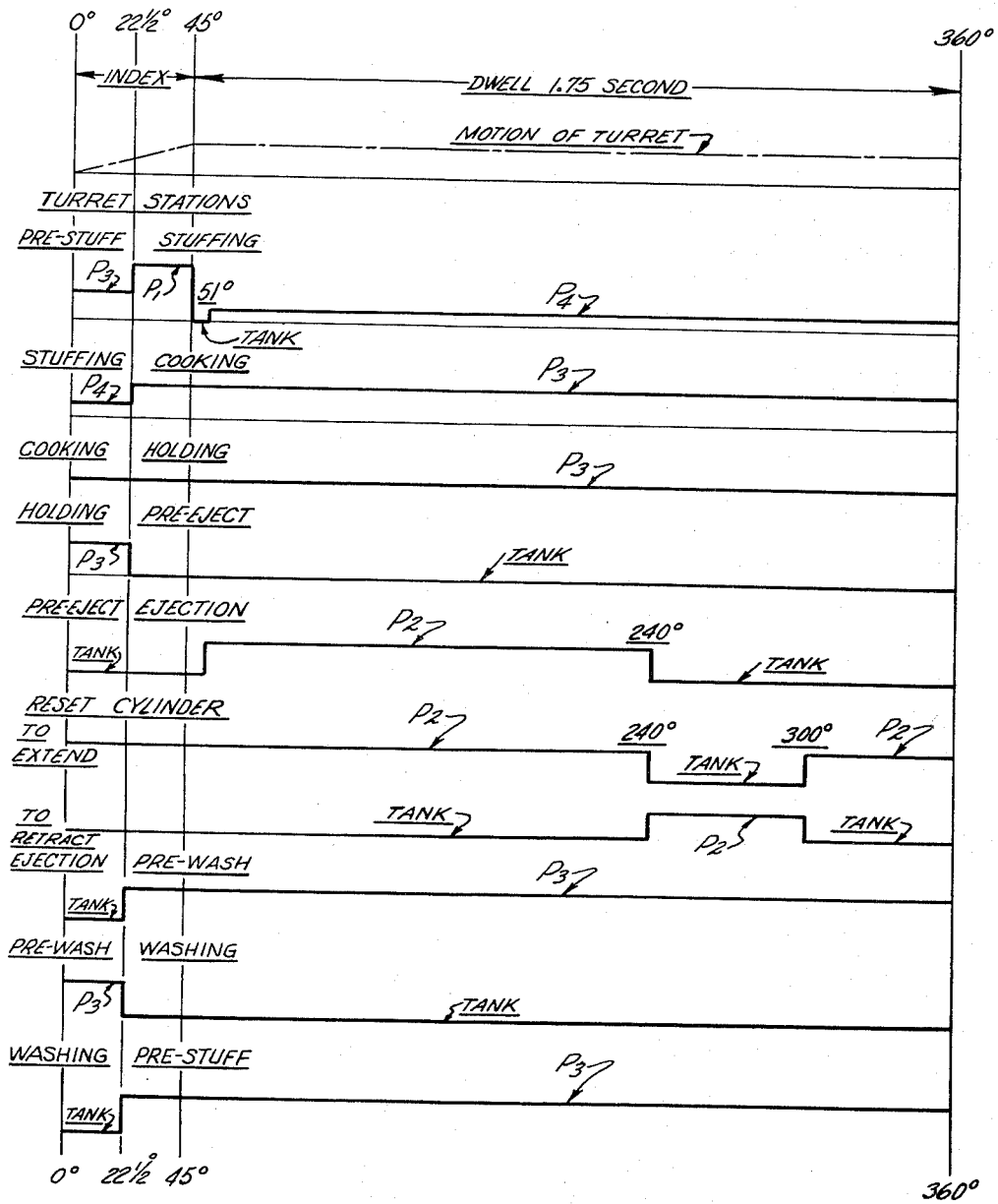
FIGURE 27 is a diagram graphically illustrating motion of the turret during each revolution of the turret indexing wheel and the pressures applied to operate the plunger at stations through which each mold and plunger moves upon a revolution of the turret.

In operation of the product forming and cooking machine, the turret 60 is rotated in a step by step or indexing fashion so that each mold is successively moved through a sequence of stations whereat particular operations are carried out in producing the product. In the embodiment specifically illustrated, forty separate stations are provided through which each mold is moved by successive indexes of the turret in a complete revolution of the turret. It will, of course, be recognized that more or less stations may be provided within the scope of the instant invention depending on the nature, size, etc. of the product to be produced. The various stations through which each mold is moved as the turret rotates are illustrated generally in FIGURES 8 through 16 and such stations will be described in connection with these figures. Additionally, reference to FIGURES 26 and 27 is helpful in explaining the operation being carried out by each plunger as it successively moves through the stations upon turret rotation.

At this point, it may be well to briefly identify the various stations through which each mold is carried for a better understanding of the operation and purpose of the structural details described hereinafter. In conjunction with FIGURES 8 through 16 and 27 the stations may be listed as follows:

| Station | Figure on Drawings | Station Function | General Operation Performed at Station |
|---|---|---|---|
| I | 9 | Stuffing | Emulsion is introduced under substantial pressure into mold 65 as plunger 95 is forced back by emulsion. |
| II | 10 | Cooking | Emulsion introduced at Station I and while under substantial pressure is rapidly heated by electric current flow therethrough |
| III-XXXV | 11 | Holding | The cooked product is held under substantial pressure to effectively form the product while the mold is moved through these stations. |
| XXXVI | 12 | Pre-eject | The holding pressure for Stations III-XXXV is relieved to prevent premature ejection of the product as the mold moves into alignment with the ejection port at the next station. |
| XXXVII | 13 | Ejection | The cooked and formed product is ejected from the mold through the ejection port onto the conveyor. |
| XXXVIII | 15 | Pre-wash | Pressure is applied to retain plunger 95 against plate 63 for cleaning of the electrode face during index of the turret to the next station. |
| XXXIX | 16 | Washing | Water is introduced into the mold to clean and cool the mold as the plunger is forced back. |
| XL | 8 | Prestuff | Wash water expelled from the mold to position piston 96 in condition for stuffing operation at Station I. |

It has been mentioned that within the contemplated scope of this invention more or less stations may be provided in the apparatus. As an example, in an apparatus for producing larger meat products such as loaf-type lunch meats, etc., six molds of a size corresponding to the desired loaf size may be provided for the turret with separate stations for each of the functions of stuffing, cooking, holding, ejection, washing and prestuff.

Turret drive means

Drive means is provided for rotating the turret in a step by step or indexing fashion so that the molds will be successively moved from one station to the next and have a predetermined dwell period at each station. The essentials of this drive means are illustrated on FIGURES 6 and 7.

Each of the rings 70 and 71 is provided with gear teeth on its periphery. A shaft 110 is rotatably mounted in bearings 111 and 112 to rotate about an axis parallel to the axis of shaft 75 on which the turret is rotatably mounted. Bearing 111 is carried by support 68 and bearing 112 is carried by support 69. Shaft 110 has secured thereto a pinion 113 which drivingly meshes with the teeth on the periphery of ring 70, and a pinion 114 which drivingly meshes with the teeth on the periphery of ring 71. The rear end of shaft 110 has a disc 115 secured thereto, this disc having mounted on the rear face thereof a series of rollers 116. These rollers are mounted with their axes parallel and equally spaced around the circumference of a circle, the center of such circle coinciding with the axis of the shaft 110. In the specific embodiment illustrated, ten rollers 116 (FIGURE 7) are illustrated, these rollers cooperating with an indexing wheel 117 having an indexing cam 118 formed thereon.

Indexing cam 118 extends radially from the perimeter of wheel 117 and provides a radial flange portion which is continuous except for the interruption 119 where the cam curves from one face of wheel 117 over to the opposite face as shown in FIGURE 7. The flange portion of cam 118 passes between adjacent ones of the rollers 116. It will be recognized that as wheel 117 rotates in a clockwise direction as shown in FIGURE 6, disc 115 carrying rollers 116 will remain stationary while the flange portion of cam 118 is passing between adjacent rollers. At this time the shaft 110 to which disc 115 is secured will hold the turret 60 in a particular position by the intermeshing of pinions 113 and 114 with the teeth on the respective rings 70 and 71. As indexing wheel 117 continues to rotate the curved portion of cam 118 will engage between adjacent rollers 116 causing a predetermined extent of angular rotation of disc 115 with one of the rollers passing through the interruption 119 in the flange portion of indexing cam 118. This predetermined angular rotation of disc 115 is transmitted through shaft 110 and the pinions mounted thereon to effect indexing of the turret 60 so that each of the molds 65 is carried to the next station.

The indexing wheel 117 is mounted on a shaft 120 driven by a gear 121 which meshes with a pinion 122 rotatably supported on shaft 123. Pulley 124 is secured to the outer end of shaft 123. A belt 125 engages pulley 124 and a pulley 126 mounted on the shaft of a motor 127. The motor 127 is suitably supported on the base for the forming and cooking machine. It will thus be seen that indexing movements of the turret 60 are effected in timed relation to the rotative speed of indexing wheel 117 which is driven by motor 127.

It may best be pointed out at this time that the hydraulic fluid scheduling valve 130 and cook initiating switch mechanism 131 are also driven in timed relation to the speed of motor 127 by gear 132, which is mounted on shaft 133 and meshes with gear 121. Further for timing of the turret index movements with respect to the scheduling of application of hydraulic fluid to control operation of the plungers, indexing wheel 117 and valve 130 and mechanism 131 are geared to rotate at the same speed. The index drive and scheduling valve 130, along with the driving gears therefor, are enclosed within a housing 135 which is secured to the rear of plate 76 upon which these elements are supported. It will be noted that the cover of housing 135 has been removed in FIGURE 7 to show the parts mounted within such housing.

As shown in FIGURE 7, a suitable bevel gear drive 136 is provided for a power takeoff to drive the conveyor by means of which the products are conveyed from the ejection station of the machine.

Limit stops at stuffing, ejection and washing stations

Reference may now be had to the stop means provided to limit axial movement of the plungers 95 at certain positions of operation of the turret. Three separate stops are provided, one of these being adjustable from the exterior of the structure to cooperate with the flange 98 on the plunger disposed at the stuffing station, the second being hydraulically actuated for operation in retracting or resetting the plunger in the ejection station, and the third being mounted to limit retraction of the plunger at the washing station.

The stop located at the stuffing station I functions to limit rearward movement of the plunger as the emulsion E is fed into the mold 65 to form the product P. As the plunger is forced rearwardly by the emulsion entering the mold at station I, the length of the product to be produced is determined by the extent of movement of the plunger from the mold 65. The stop at this station is mounted to be manually adjustable from a point externally of the structure to permit ready adjustment of the length of the product being produced as may be desired. The structure and mounting of this stop is best shown in FIGURES 21 and 22. A disc stop 140 is secured to a rod 141, which rod in turn is rotatably carried in a mounting 142, a thrust bearing 143 being provided between one end of the rod and the mounting to permit free rotation of the disc stop 140 when the turret is indexed away from the stuffing station I. The relationship of disc stop 140 to the flange 98 on plunger 95 at the stuffing station is shown in FIGURE 9.

Mounting 142 is slidably supported on a tubular guide 145 which is secured at its opposite ends to the supports 68 and 69, respectively. A pin 146 carried by support 142 extends diametrically of guide 145 through slots 147 and is engaged with an internally threaded member 148. A screw 149 is threadably coupled to member 148 and extends outwardly of guide 145 and through the front face of support 68, with a bevel gear 150 at the outer end thereof. A housing 151 supports a stub shaft 152 provided with a bevel gear 153 meshing with gear 150 within the housing and a hand wheel 154 exteriorly of the housing. It will thus be seen that by manually turning the hand wheel 154 the screw 149 will be rotated to thread the member 148 onto or off of the screw, depending upon the direction of rotation of the hand wheel. By reason of the connection of member 148 to support 142 through pin 146, the disc stop 140 on support 142 will be correspondingly moved along with member 148. Thus, the position of disc stop 140 longitudinally of the plunger on the turret 60 can be adjusted to determine the limit of rearward movement of each plunger at the stuffing station I when the emulsion E is being introduced into the mold.

The second of the three stop means provided in the cooking and forming structure is disposed at the ejection station, such stop means additionally performing a resetting operation for the plunger at the ejection station to withdraw the plunger from the ejection port in the front plate after the product has been ejected so that the turret may be indexed to the next station. This stop means is shown in FIGURES 6 and 19.

The limit of forward movement of a plunger in ejecting the product and resetting of the plunger is effected by an abutment stop 160 which engages with the flange 98 on the plunger 95 at the ejection station. Abutment stop 160 is fastened to a support 161 which in turn is clamped to a tube 162. The tube 162 is slidably supported at its forward end by a guide 163 mounted in support 68 and supported at its other end by a piston rod 164 which extends from the cylinder of a hydraulic actuator 165, which actuator is mounted on support 69. The piston rod 164 is connected to tube 162 by pin 166 so that introduction of hydraulic fluid into actuator 165 through tubes 167 or 168 will cause tube 162 to shift and move abutment stop 160 therewith. A spring 169 is disposed within tube 162 and compressed between the tube end carrying pin 66 and a backup block 170 resting against a pin 171 carried by guide 163 and extending diametrically across through slots formed in opposite sides of tube 162. Spring 169 thus urges abutment stop 160 rearwardly to the reset position. In the position shown in FIGURE 6 the abutment stop 160 has been moved forwardly by actuator 165, permitting plunger 95 to eject a product. In such relation, the plunger extends into the ejection port 175 in front plate 63, which would prevent indexing of the turret unless the plunger is reset by the retracting action of abutment stop 160. This resetting of the plunger is effected by actuator 165 assisted by spring 169 under hydraulic control as will be described.

The third stop means as shown in FIGURE 20 is provided at the wash station XXXIX to limit rearward movement of the plunger as the wash water is introduced to clean the mold 65 after a product has been ejected. For this purpose a flange stop 180 is provided rotatably mounted on a guide rod 181 between collars 182 secured to the rod by suitable set screws 183. A thrust bearing 184 is provided to enable free rotation of flange stop 180 as the flange 98 on a plunger moves out of engagement with flange stop 180 on indexing of the turret away from station XXXIX. Guide rod 181 is mounted to extend horizontally between the supports 68 and 69 adjacent the washing station XXXIX.

*Cooking circuit associated with turret*

Attention may now be directed to the electric circuit employed in cooking the product at cooking station II. Referring to FIGURE 10, the product P is disposed between the electrode 102 at the end of piston 96 of plunger 95 and a plug electrode 185 mounted in front plate 63 at the cooking station. Plug electrode 185 may be appropriately made of nickel or graphite similar to the material of electrode 102. A housing 186 is secured to the outer face of plate 63 and contains a spring 187 which urges electrode 185 inwardly against ring 70 at the front section of the turret. The end of housing 186 is closed by a removable plug 189 which enables replacement of electrode 185 as may be required.

A fluid inlet port 188 is provided in housing 186 to admit hydraulic fluid pressure to act against electrode 185. A pressure comparable to the pressure admitted to cylinder 72 and acting against piston 97 at the cooking station is employed so that the force of the plunger compressing the product P during the cooking operation and tending to force electrode 185 out of plate 63 will be counterbalanced. The electrode 185 is grounded to plate 63 and the rest of the structure so that no shock hazard is created at the exterior of the machine by the presence of grounded electrode 185. The hot electrode 102 carried at the end of piston 96 is connected for application of the cooking current to the product P by a brush contact 190 which engages piston 96 as shown in FIGURES 10 and 25.

The brush contact 190 is pivotally mounted on a pin 191 carried by an insulating support 192, which support is in turn secured to sleeve 79 on shaft 75. A spring 193 urges the end of contact 190 outwardly into engagement with the plungers 95 as they move through the cooking station upon turret rotation. It will be noted that the end of contact 190 is located to engage only the plunger 95 which is disposed at the cooking station II at a particular indexed position of the turret. The brush contact 190 is electrically connected by jumper lead 194 to wire 195, which wire extends through the interior of shaft 75 to the switch for applying the current for the proper time period. A description of the initiation and timing of the cooking cycle will be given in connection with the description of the circuitry in FIGURES 28 and 29 as employed to carry out this operation. It should be sufficient to state at this point that the cooking is effected by applying a potential between electrodes 102 and 185 such that the product P disposed between such electrodes and enclosed within the molds 65 made of insulating material forms a resistance load which is uniformly heated by the flow of current therethrough.

*Cleaning electrode face and mold*

As referred to hereinabove, the plunger 95 is reset by abutment stop 160 to the position as shown in FIGURE 14 before index of the turret commences. As the turret moves the plunger from the ejection station XXXVII to the pre-wash station XXXVIII, the plunger is moved back into engagement with the front plate 63 and pressed thereagainst by the application of pressure to its piston 97, with air being vented through a passage 196 in front plate 63.

To clean the face of electrode 102, means are provided intermediate the pre-wash station XXXVIII and the wash station XXXIX to scrape and flush such electrode face. This means is shown in FIGURES 15 and 17 and includes water inlet 197 which directs a stream of flushing water against the face of electrode 102 as the electrode moves past the stream during index of the turret to the wash station. The water is collected in cavity 198 and drained from such cavity and from the machine through drain 199. As the turret indexes, the trailing edge of cavity 198 scrapes the face of electrode 102 as the plunger is pressed against plate 63 by hydraulic pressure.

At the wash station XXXIX, an inlet 200 for wash water is provided in plate 63. Desirably this water is sprayed into the mold to not only clean it but also promote cooling of the mold to offset mold temperature build-up upon continuous operation of the apparatus. Similarly an outlet for water 201 is provided at the pre-stuff station XL.

*Distribution of hydraulic fluid pressure to actuate plungers*

Reference will now be had to the distribution and scheduling of the application of hydraulic fluid to the turret plungers to effect their proper operation in conjunction with indexing movements of the turret. As heretofore mentioned a passage 74 in the rear section of the turret extends through member 73 from the interior of each cylinder 72. These passages terminate radially inwardly from the cylinders with which they cooperate in a series of ports spaced on the circumference of a circle having its center coincident with the axis of shaft 75. Back plate 67 stationarily mounted on support 69 cooperates with member 73 and functions as a distributor to direct hydraulic fluid to the appropriate cylinder 72, depending on the indexed position of the turret in relation to the front plate 63.

The face of plate 67 is provided with recesses disposed to cooperate with the radially inner ends of passages 74 in accordance with the indexed position of the turret. The formation of the recesses in the face of plate 67 is illustrated on FIGURES 23 and 24. An inner circular recess 210 and an outer circular recess 211 define therebetween an annular space in which a series of recesses of predetermined angular width are disposed. The circular recesses 210 and 211 are vented by passages 212 and 213 respectively. These recesses and the venting passages therefrom serve to collect and conduct away any hydraulic fluid which may escape from the separate recesses disposed between recesses 210 and 211. The annular area intermediate the concentric circular recesses 210 and 211 includes a recess 214 having a fluid line 215 communicating therewith to conduct fluid into the recess. The plate 67 is mounted on support 69 relative to plate 63 on support 68 so that recess 214 is disposed to apply fluid pressure therewithin through the proper passage 74 to cylinder 72 and plunger 95 disposed at the stuffing station I. A recess 216 of substantial angular width and having a line 217 for introduction of fluid into such recess is provided so as to apply the fluid pressure within recess 216 to all of the plungers disposed at the cooking and holding stations II through XXXV.

A recess 218 having a line 219 for conducting fluid thereinto is provided spaced from but adjacent the end of recess 216, this recess 218 being disposed to communicate fluid pressure therewithin to act on the plunger at the pre-eject station XXXVI. A recess 220 having a line 221 communicating therewith is disposed next to but spaced from recess 218. Recess 220 is positioned to communicate pressure therewithin to act on the plunger positioned at the ejection station XXXVII. A recess 222 having a hydraulic fluid line 223 communicating therewith is positioned to apply the pressure therewithin to act on the plunger at the pre-wash station. A recess 224 having a fluid line 225 communicating therewith is positioned to communicate the pressure therewithin to act on the plunger disposed at the wash station XXXIX. A recess 226 having a fluid line 227 communicating therewith is positioned to communicate the pressure therewithin to act on the plunger disposed at the pre-stuff station XL.

The application of appropriate hydraulic fluid pressures to the recesses in plate 67 is illustrated in the hydraulic circuit diagram of FIGURE 26. Thus, FIGURE 26 illustrates the cooperation of the hydraulic fluid scheduling valve 130 and the cook cycle initiating switch mechanism 131 which are driven by motor 127 in the manner as discussed hereinabove with respect to FIGURE 7. FIGURE 27 graphically illustrates the relationship of the hydraulic pressures as applied at the various stations and the indexing of the turret relative to these stations.

In FIGURE 27 the degree designations may be taken as having reference to the angular rotation of indexing wheel 117 and scheduling valve 130. For purposes of illustration the zero degree point on FIGURE 27 has been arbitrarily selected as the position of indexing wheel 117 and the indexing cam 118 thereon relative to rollers 116 on disc 115 at the point where the indexing cam 118 will initiate indexing movement of disc 115 on continued rotation of indexing wheel 117. It will thus be noted that the indexing movement of the turret occurs at 45° angular rotation of the indexing wheel from the 0° position with the turret remaining stationary or dwelling at the indexed position for the remaining 315° of rotation of the indexing wheel. Merely by way of example, on FIGURE 27 the speed of operation of the indexing drive means has been illustrated as resulting in two seconds elapsing between the initiation of index movement from one station to the time of initiation of index movement from the next station. The actual indexing movement occurs in 0.25 second with a dwell of 1.75 seconds. Motion of the turret with indexing occurring in the first 45° of rotation of the indexing wheel and the turret remaining stationary for the dwell period is illustrated at the top of FIGURE 7.

Before discussing the hydraulic control circuitry of FIGURE 26, it may be well to refer to the pressures acting on the turret plungers at the various turret stations as illustrated in FIGURE 27 and taken in conjunction with FIGURES 8 through 17. In automatically carrying out the various operations for the plungers, four separate hydraulic pressures are employed along with tank pressure which normally may be considered as equal to atmospheric pressure. This latter pressure is the pressure existent in the hydraulic fluid supply tank. The four pressures have been denoted on FIGURE 27 as $P_1$, $P_2$, $P_3$ and $P_4$, with $P_1$ being the highest pressure and the other pressures being of progressively lesser magnitude, with $P_4$ the lowest.

Referring to FIGURE 27 and the pressures applied to the plunger at each turret station, it will be seen that as the turret moves during index from the pre-stuff station XL where the plunger is exposed to pressure $P_3$, at mid-index the highest pressure $P_1$ is applied to the plunger. Application of this pressure is continued until the turret is fully indexed to align the mold with stuffing nozzle 61 at stuffing station I. The application of this high pressure $P_1$ is important in that it insures that the piston 96 within the mold is held firmly against front plate 63 preventing admission of the emulsion until the mold 65 is fully aligned to be concentric with the outlet of emulsion nozzle 61. In the absence of application of this high holding pressure $P_1$, seepage of emulsion E into the mold will occur upon initial communication of the mold with the stuffing nozzle. It has been found that this results in wire drawing of the emulsion causing excess mechanical working of the emulsion and precludes proper introduction of the emulsion into the mold. Under such conditions, the end product is poorly formed and tends to separate, giving an unsatisfactory product.

Once the turret is fully indexed to align the mold with the stuffing nozzle at stuffing station I, the high pressure $P_1$ is relieved to tank pressure or atmospheric pressure for 6° rotation of the indexing wheel and hydraulic scheduling valve. Thereafter relatively low pressure $P_4$ is applied to the plunger at the stuffing station whereupon the emulsion under pressure will enter the mold retracting the plunger until stopped by disc stop 140.

Pressure $P_4$ may be in the order of 5 to 50 p.s.i. which serves to back up or offer resistance to introduction of the emulsion E into the mold under the stuffing pressure, which is in the order of 120 p.s.i. or more. This back up pressure $P_4$ insures proper distribution of the emulsion fibers as desired in the end product, with the major portion of these fibers disposed transversely to the longitudinal axis of the product and a layer of fibers adjacent the surface of the product generally aligned to be parallel with the axis of the product. With regard to the desired manner of introduction of emulsion into the mold to produce a good product, the size of the stuffing nozzle outlet say in the order of three-eighths of an inch relative to the interior diameter of the mold say in the order of seven-eighths of an inch is of particular importance as has been previously pointed out.

Relatively low pressure $P_4$ is maintained against the plunger at the stuffing station I and until mid-index of the mold from the stuffing station to the cooking station II. At mid-index the pressure applied to the plunger is increased to pressure $P_3$ with this pressure also acting through port 188 against electrode 185 mounted in front plate 63. Pressure $P_3$ should be at least 50 p.s.i. with 100 p.s.i. or more being preferred to maintain the emulsion under substantial pressure while the emulsion in the mold is disposed at the cooking and holding stations II through XXXV.

As shown in FIGURE 27, the pressure $P_3$ is maintained continuously through the cooking and holding stations. As the turret is indexed from the last holding station XXXV to pre-eject station XXXVI, the pressure $P_3$ is relieved to tank or atmospheric pressure. Tank pressure is maintained on the plunger during full index to the ejection station XXXVII to insure that as the product within the mold is moved into alignment with the ejection port 175, it will not be prematurely expelled so as to destroy the configuration of the product by its being driven against the edge of ejection port 175 on front plate 63. At 51° rotation of the indexing wheel and the hydraulic scheduling valve, pressure $P_2$ is applied against the plunger at the ejection station to drive the plunger forward and thereby eject the product from the mold through ejection port 175. At 240° rotation of the indexing wheel and scheduling valve the pressure $P_2$ is relieved to tank pressure.

At this point reference may be made to the operation of the abutment stop 160 which resets the plunger at the ejection station to enable the turret to index. Referring to FIGURE 6, the application of fluid pressure through line 168, with line 167 relieved to tank or atmospheric pressure acts to extend abutment stop 160 forwardly. Similarly, application of pressure to line 167 with line 168 relieved to tank pressure acts to retract or reset abutment stop 160. As shown in FIGURE 27 pressure $P_2$ is applied to extend abutment stop for the first 240° of rotation of the indexing wheel and scheduling valve. At this time tank pressure exists in line 167. Between 240° and 300° rotation of the indexing wheel the reset cylinder 165 has tank pressure applied through line 168 and pressure $P_2$ applied to line 167. Thereupon the abutment stop 160 is retracted to reset the plunger by engagement with plunger flange 98 drawing the plunger back into the mold 165 to the position as shown in FIGURE 14.

As the turret indexes from the ejection station XXXVII to the pre-wash station XXXVIII, pressure $P_3$ is applied to the plunger to urge it forwardly against plate 63, expelling any trapped air through passage 196. Pressure $P_3$ exists on the plunger until mid-index from the pre-wash station to the washing station XXXIX. During this indexing the face of the plunger electrode 102 is cleansed in the manner as heretofore described with respect to FIGURE 17.

At the washing station XXXIX the plunger is relieved to tank pressure so that water introduced under pressure through port 200 may fill the mold 65, forcing the plunger rearwardly until plunger flange 98 engages flange stop 180. As the turret indexes from the washing station XXXIX to the pre-stuff station XL, pressure $P_3$ is reapplied against the plunger to force the wash water from the mold through port 201. Thereupon the mold is conditioned for indexing to the stuffing station and the pressure cycle as described is repeated.

It will, of course, be understood that each mold passes in succession through the various stations enumerated. With forty molds in the turret, at each index position, a mold is disposed at each of the forty stations. Thus, for example, while one mold is at the stuffing station receiving a charge of emulsion, the mold ahead of it is disposed at the cooking station where the emulsion charge is being cooked, and the mold behind it is at the pre-stuff station where the wash water is being discharged therefrom. The apparatus thus provides automatic continuous production of products commencing from the meat in water emulsion.

Hydraulic fluid control circuit

Reference will now be had to the hydraulic circuit diagram shown in FIGURE 26. A suitable tank 240 is provided to contain a supply of hydraulic fluid F. A hydraulic fluid pump 241 having a strainer intake 242 is mounted within the tank to be driven by a pump motor 243. The output of this pump is conducted through line 244 to provide pressurized hydraulic fluid to operate the hydraulic motor 30 which in turn drives the emulsion screw pump 11 and positive displacement emulsion pump 13 as shown on FIGURE 3. The hydraulic pump 241 also supplies fluid to pressure regulators to provide the various pressures called for in automatic operation of the apparatus.

An adjustable pressure bypass 245 is connected to relieve hydraulic fluid pressure from pump 241. This pressure bypass may be adjusted as desired to alter the maximum operating pressure supplied in line 244. Hydraulic fluid is conducted through flow rate controller 250 to the inlet line 55 for hydraulic motor 30. By adjustment of the flow rate controller 250, the speed of hydraulic motor 30 may be varied since the motor speed is essentially proportional to the rate of flow of hydraulic fluid therethrough.

An adjustable pressure bypass valve 255 is connected in parallel with hydraulic motor 30. This valve may be set to determine the stall point pressure for motor 30. In other words, by adjustment of valve 255 the maximum pressure at which motor 30 will be stalled or rotation stopped can be set since pressure buildup above the setting of valve 255 will bypass through valve 255 to outlet line 56. By this means the maximum pressure for the emulsion may be readily adjusted since emulsion pressure represents the load on pumps 11 and 13, and this load is related to the pressure drop across motor 30 required to operate the motor to give a particular emulsion output pressure.

A back pressure relief valve 260 is mounted in line 56 between motor 30 and tank 240 to determine the relief pressure against which motor 30 operates. This valve 260 may be adjusted to raise or lower the pressure in line 56. Drain line 57 as shown on FIGURE 3 and mentioned heretofore in connection with FIGURES 3 and 4 extends from motor 30 to communicate with the tank 240.

It will be readily appreciated from the above described structure that the hydraulic fluid motor 30 which drives the emulsion screw pump 11 and positive displacement pump 13 is connected to be effectively controlled so that the rate of feed of emulsion may be adjusted by setting flow rate controller 250, and the maximum emulsion pressure varied by setting valve 255 which determines the pressure drop at which the hydraulic motor stalls.

Hydraulic fluid in line 244 is supplied to a pressure regulator 265 to provide in line 266 a control pressure $P_1$. Hydraulic fluid is conducted to a pressure regulator 270 with the outlet pressure from such regulator in line 271 providing pressure $P_2$. A regulator 275 provides in line 276 control pressure $P_3$. The fourth and lowest pressure $P_4$ is provided by restricter valve 280 having its inlet connected to line 276 and its outlet connected to line 281. A spring biased relief valve 282 is provided in line 281 to relieve hydraulic fluid pressure to tank 240. Thus pressure $P_4$ is provided in line 281.

Reference has heretofore been made to the hydraulic fluid scheduling valve 130 and the cook cycle initiating switch mechanism 131. As shown in FIGURE 7, these devices are mounted within housing 135, supported on shaft 133 and driven through gear 132 by gear 121. Gear 121 is connected by shaft 120 to drive indexing wheel 117. The ratio between gears 121 and 132 is such that for each revolution of indexing wheel 117 valve 130 will also go through a full revolution. Thus, for each index and dwell in turret movement, a full revolution of the scheduling valve 130 occurs.

A schematic showing of the structure of valve 130 is shown on FIGURE 26. The nine hydraulic control segments of the valve are shown separated to facilitate description of their functions. It will be understood that in the actual valve the segments are interconnected to rotate in unison with shaft 133. For purposes of description, the various segments will be identified by letters $a$ through $j$.

The valve 130 includes a core 285 which extends longitudinally of the valve and rotates relative to the valve casing 286. The core 285 has four longitudinal passages 287, 288, 289 and 290. Passage 287 in segment $a$ has a radial opening which communicates with an annular groove 291 surrounding this segment, this groove communicating through line 292 with hydraulic fluid tank 240. Passage 288 in segment $b$ has a radial opening which communicates with an annular groove surrounding this segment, such groove communicating with pressure $P_4$ in line 281. Passage 289 has a radial opening in segment $c$ communicating with an annular groove 295, which groove has applied thereto pressure $P_2$ from line 271. Passage 290 has a radial opening in valve segment $d$ which communicates with an annular groove 296 surrounding this segment, which groove has pressure $P_1$ applied thereto through line 266.

Referring for a moment to the right hand portion of FIGURE 26, the back plate 67 and the fluid distributing recesses therein are shown. Reference numerals as heretofore described in connection with back plate 67 and discussion of FIGURES 23 and 24 have been applied to the illustration of the back plate on FIGURE 26.

Valve segment $e$ includes a radial opening from passage 288 which admits pressure $P_1$ to a groove 298. Groove 298 extends through a substantial portion of the circumference of the rotor portion within this segment but is interrupted by lands disposed on opposite sides of a radial opening 299. As the rotor 285 of valve 130 rotates in timed relation with indexing wheel 117 the radial opening 299 in segment $e$ moves into communication with line 297, thereupon applying pressure $P_1$ to line 297 and thence through a non-stuff valve 300 to line 215. This timed operation applies the pressure $P_1$ to hold the plunger for the mold approaching alignment with the stuffing nozzle.

The pressure $P_1$ is relieved to tank pressure as indicated on FIGURE 27 by the following operation. As rotor 285 continues to rotate the groove 298 in segment $e$ is again brought in communication with line 297. At this time pressure $P_4$ would again be applied, except that pressure $P_4$ is momentarily placed in communication with tank pressure by the operation of valve segment $f$. The rotor portion in this segment has a radial opening 301 extending from passage 288. When groove 298 in segment $e$ recommunicates with lines 297 as rotor 285 rotates, the opening 301 in segment $f$ moves into communication with line 292, which latter line is connected to tank 240. Thus, the pressure $P_4$ in passage 288 is bled off to tank resulting in tank pressure being applied through groove 298 in valve segment $e$, line 297, valve 300 and line 215. As the rotor 285 continues rotation, opening 301 in segment $f$ passes out of communication with line 292 and thereupon pressure $P_4$ is again built up in passage 288 through line 281 so that pressure $P_4$ will be applied to the plunger at the stuffing station until rotation of rotor 285 again brings the opening 299 in valve segment $e$ into communication with line 297.

As the turret rotates carrying the molds through the cooking and holding stations the pressure $P_3$ is continuously applied as heretofore described in connection with FIGURE 27. As shown in FIGURE 26, recess 216 in back plate 67 communicates the pressure in line 217 to the plungers at these stations, with line 217 being connected to pressure $P_3$ through line 276.

At the pre-eject station, tank pressure is applied. Thus line 219 is connected through line 305 to communicate with tank 240.

At the ejection station, tank pressure is applied except for the period between 51° and 240° of rotation of the indexing wheel and scheduling valve, during which period pressure $P_2$ is applied. In the position of valve 130 shown in FIGURE 26, tank pressure is applied to line 221 through valve segment $g$. The rotor portion in this valve segment has two grooves 306 and 307 separated by lands. Groove 306 communicates with tank pressure through a radial opening from passage 287. Groove 307 communicates with pressure $P_2$ through a radial opening from passage 289. It will be seen that as rotor 285 rotates, line 221, which, as shown, is communicating with tank pressure through groove 306, moves into communication with groove 307 so that pressure $P_2$ is applied for the appropriate period between 51° and 240° rotation of the indexing wheel and scheduling valve.

In conjunction with the application of pressure $P_2$ at the ejection station, which pressure acts to extend the plunger to eject the product through the ejection port 175, the reset abutment stop is operated to reset the plunger so that the turret will not be obstructed in its next indexing movement. The control of hydraulic actuator 165 for reset of abutment stop 160 is effected by valve segments $h$ and $i$ of valve 130. The portion of rotor 285 in each of these segments has a pair of grooves which are separated by lands, with one groove communicating with tank pressure through passage 287, and the other groove communicating with pressure $P_2$ in passage 289. The respective grooves are related in the two segments $h$ and $i$ such that as the rotor rotates, pressure $P_2$ will be applied through line 168 to extend abutment stop 160 while line 167 communicates with tank. Between 240° and 300° the pressure relationship will be reversed and line 167 will have pressure $P_2$ applied thereto to retract abutment stop 160 and thereby reset stop 160 and the plunger 95 while line 168 will communicate with tank pressure.

At the pre-wash station pressure $P_3$ is applied. The application of this pressure from line 276 through a flow rate controller 315 to line 223 is shown on FIGURE 26. The flow rate controller 315 precludes rapid admission of fluid to the plunger which might slam the plunger forwardly against plate 63 from its position shown in FIGURE 14 and thereby damage the electrode or other parts.

At the wash station the plunger is exposed to tank pressure. Thus, as shown in FIGURE 26, line 225 communicates through line 305 with tank 240. This permits water to be introduced to flush the mold by retracting the plunger until its flange 98 engages stop 180.

At the pre-stuff station pressure $P_3$ is applied to expel the wash water which was introduced at the wash station. As shown in FIGURE 26, line 27 communicates through flow rate controller 315 with pressure $P_3$ in line 276. Again controller 315 serves to avoid excessively rapid expelling of the wash water and movement of the plunger into engagement with plate 63 at a rate which might cause damage to the parts.

*Discontinuing stuffing operation in stopping machine*

Reference has heretofore been made to the non-staff valve 300. In the position of this valve as shown in FIGURE 26, the hydraulic circuit is set up to continuously operate the plungers at the various stations with an emulsion charge being introduced into each mold while it is disposed in alignment with the stuffing nozzle. At all times during operation of the machine the valve 300 is positioned as shown in FIGURE 26. When it is desired to cease operation of the machine or for some reason to terminate the introduction of emulsion charges into the molds as they move through the stuffing station, the valve 300 is operated so that high pressure $P_1$ will be continuously applied from line 266 to line 215 so that whenever a mold is at the stuffing station its plunger will be continuously held by high pressure $P_1$ against the introduction of emulsion from the stuffing nozzle.

In order that the changeover to terminate introduction of emulsion charges into the molds shall not be made except during index of the turret, hydraulically operated latches 317 and 318 are provided in conjunction with non-stuff valve 300. These latches are operable so that the spool 319 of valve 300 is prevented from shifting except when the latches are hydraulically retracted. The fluid pressure in line 297 is applied to simultaneously operate latches 317 and 318.

In the relation of scheduling valve 130 as shown in FIGURE 26 pressure $P_4$ exists in line 297. This pressure is insufficient to overcome the upward biasing force of the springs in latches 317 and 318. Accordingly, latch 317 is in its upper position to prevent leftward shift of spool 319 while latch 318 is held down by the spindle of spool 319 disposed thereabove. When rotor 285 of valve 130 moves opening 299 in segment $e$ into communication with line 297, pressure $P_1$ is applied to line 297 as heretofore described. This pressure operates both latches 317 and 318, withdrawing them so that the spool 319 can be shifted leftwardly to cut off communication between line 297 and line 215 and place line 215 in communication with line 266. Thereafter pressure $P_1$ in line 266 will be continuously applied to hold the plungers passing through the stuffing station under high pressure against introduction of emulsion at the stuffing station.

The shifting of spool 319 of valve 300 is under control of stop valve 320. In the position of stop valve 320 as shown in FIGURE 26, pressure $P_1$ communicates with line 321 to apply this pressure to the left side of spool 19 while line 322 is in communication by line 323 with tank 240. Thus, pressure $P_1$ will hold spool 319 to the right irrespective of actuation of latches 317 and 318. The stop valve 320 is biased to the left by spring 324 and may be actuated by solenoid 325. A control relay 326 is connected to be energized by a normally open run switch 327 and has holding contacts 326a in series with a stop switch 328. Solenoid 325 is connected in series with contacts 326b so that upon energization of relay 326 by pressing normally open run switch 327, contacts 326a and 326b will close, setting up a holding circuit for relay 326 through normally closed stop switch 328 and energizing solenoid 325. This is the condition existent as shown by the circuit in FIGURE 26.

When it is desired to cease operation, it is, of course, important that the introduction of emulsion charges into the molds passing through the stuffing station be terminated and that the machine be operated for a sufficient time to empty all of the molds which have previously been charged. This stopping operation is effected by pressing stop button 328 which interrupts the circuit for relay 326, resulting in opening of its contacts 326a and 326b and consequent deenergization of solenoid 325. Spring 324 shifts the spool of valve 320 to the left, placing line 266 in communication with line 322 and line 323 in communication with line 321. In this situation pressure $P_1$ will be applied to the right side of spool 310 of non-stuff valve 300 while the left side is relieved to tank, tending to shift such spool to the left.

Shifting of the spool will not take place under the conditions as shown in FIGURE 26 since latch 317 is disposed to prevent such shifting. However, when valve 130 operates to move opening 299 of segment $e$ into communication with line 297, latch 317 will be retracted, permitting spool 319 to shift so that thereafter during continued indexing of the turret, high pressure $P_1$ will be applied at all times against the plungers for molds moving through the stuffing station and thereby prevent introduction of an emulsion charge into such molds. The other operations in applying pressure to the plungers at the various stations need not be affected since the important feature is to avoid filling the molds with emulsion when it is desired to shut down operaion of the machine for any reason. It may be noted, however, that when no emulsion is introduced the plunger is not retracted and thereafter when this plunger is carried through the cooking station, brush contact 190 will ride over flange 98 which is insulated from piston 96 so that the power will not be applied across electrodes 102 and 185 when there is no emulsion charge in the mold.

*Time of cooking cycle*

Reference will now be had to the initiation and timing of the cooking cycle by means of which the emulsion charge introduced into each mold is subjected to heating by passage of an electric current through the emulsion charge as disposed between electrodes 102 and 185 at the cooking station II. As previously discussed, as the plunger and associated mold are moved into the cooking station by indexing of the turret the brush contact 190 engages the plunger to complete the electric circuit from wire 195 connected to the brush contact to electrode 102 through piston 96.

Figure 28:
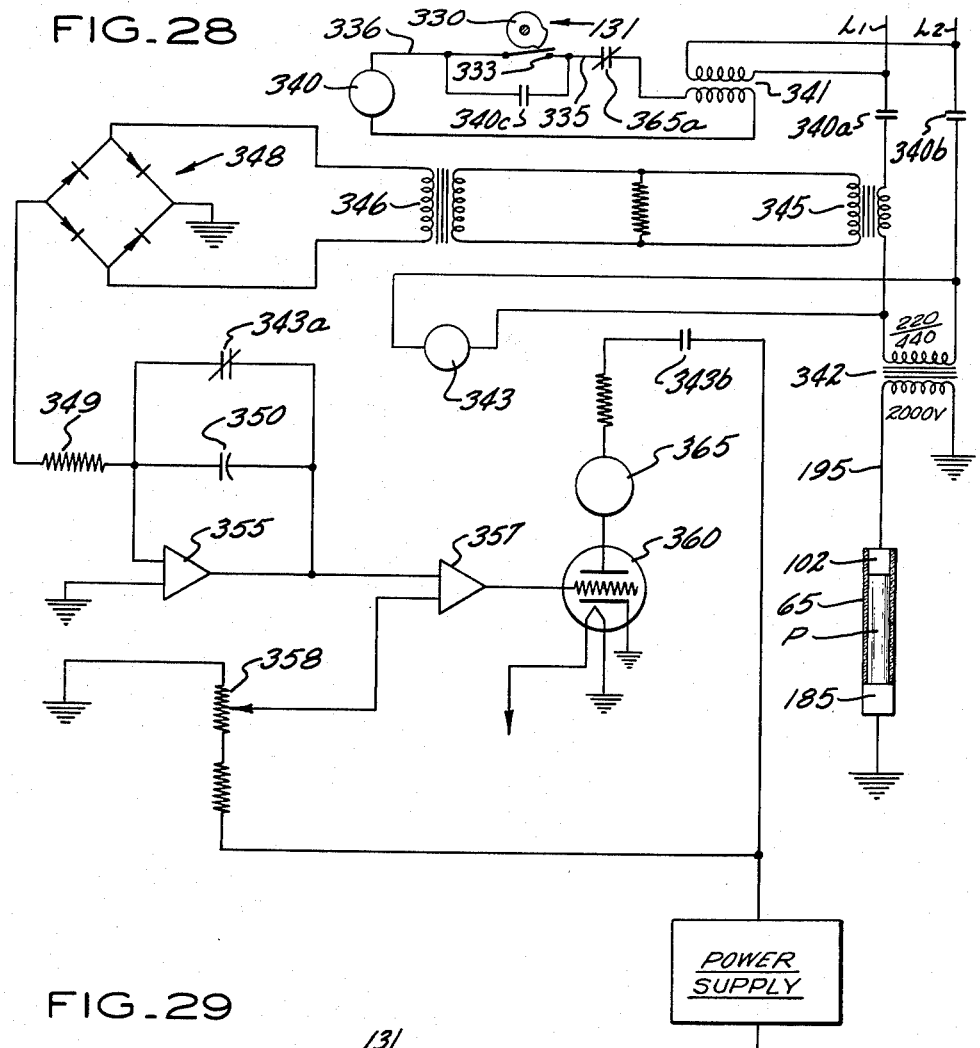
FIGURE 28 is a circuit diagram of a timer employed in control of the cooking time.
Figure 29:
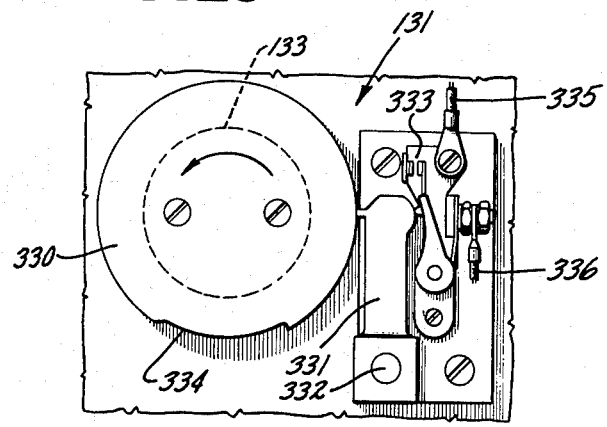
FIGURE 29 is a detailed view of a cam switch to control initiation of the cooking time.

Initiation of the heating is controlled by switch mechanism 131 shown on FIGURE 7 and shown in detail on FIGURE 29. A cam 330 is mounted on shaft 133 to rotate in synchronism with scheduling valve 130 and indexing wheel 117. A cam follower 331 pivotally mounted at 332 engages the surface of cam 330 and maintains contacts 333 open until the recess 334 on the cam permits follower 331 to move so that contacts 333 are connected by leads 335 and 336 in series with the coil of a relay 340 (FIGURE 28).

Referring to FIGURE 28 is will be seen that relay 340 is connected through transformer 341 to the power supply lines $L_1$ and $L_2$. Upon closure of cam actuated contacts 333 relay 340 is energized to close its contacts 340a, 340b and 340c. This operation connects the primary or power transformer 342 to lines $L_1$ and $L_2$ whereby the product P is subjected to heating current through its connection in the secondary of the power transformer. Contacts 340c are conncted across contacts 333 to, upon closure, set up a holding circuit for relay 340 irrespective of the subsequent opening of contacts 333.

The coil of a circuit conditioning relay 343 is connected in parallel with the primary of power transformer 342 to be energized upon closure of contacts 340a and 340b.

Current flow through the primary of power transformer 342 is sensed by current transformer 345 which applies a voltage proportional to the power current to the primary of voltage transformer 346. The output of the secondary of voltage transformer 346 is rectified by full wave rectifier 348 and the rectified voltage applied through resistance 349 to charge capacitor 350.

An amplifier 355 is connected across capacitor 350 to maintain essentially ground potential at the junction between resistance 349 and capacitor 350 by feeding an equal and opposite charge to the opposite side of the capacitor. In this way, the current flow through resistance 349 depends only on the signal voltage and is not opposed by the accumulated voltage across the capacitor 350. Therefore the voltage across capacitor 350 is proportional to the time integral of the load current. It will be noted that at this point, with contacts 340a and 340b closed, circuit conditioning relay 343 will be energized and accordingly its normally closed contacts 343a which are connected in parallel with capacitor 350 will be open.

A second amplifier 357 is connected to compare the integrated voltage on capacitor 350 with a reference voltage set on potentiometer 358. When the integrated voltage building up on capacitor 350 exceeds the reference voltage by a minute amount, the amplifier causes its output votage to change from strongly negative to strongly positive. The output voltage from amplifier 357 is connected to be applied as grid bias to the control grid of triode 360. The change in the character of the amplifier 357 output voltage from negative to positive causes triode 360 to become conducting.

The coil of a time terminating relay 365 is connected in the plate circuit of triode 360 and in series with normally open contacts 343b of circuit conditioning relay 343. With relay 343 energized, it contacts 343b are closed thereby conditioning time terminating relay 365 for operation upon triode 360 becoming conducting. When relay 365 is energized it opens its normally closed contacts 365a which are interposed in series with cam actuated contacts 333, contacts 340c, and the coil of relay 340.

Deenergization of relay 340 opens its contacts 340a, 340b and 340c to cease application of heating current to the product P and deenergize circuit conditioning relay 343, as well as open the holding circuit around cam actuated contacts 333. As relay 343 drops out, its contacts 343a close to discharge the voltage built up on capacitor 350 during the previous heating cycle, thus conditioning the circuit for operation for the next heating cycle. Also, contacts 343b open to deenergize relay 365 so that its contacts 365a are reclosed in readiness for the next cycle as initiated by closing of contacts 333 under control of cam 330. It will thus be appreciated that whereas initiation of the heating cycle is effected by rotative movements of cam 330 as driven in synchronism with scheduling valve 130 and indexing wheel 117, the termination of the heating cycle is effected by, in effect, integrating the power applied to heat the product P and interrupting the heating when the proper power has been applied. The integrating circuit thus automatically compensates in the time period of the heating cycle for variations which may occur in the resistivity of the emulsion between successive products or batches of emulsion.

It may be further pointed on that the adjustability of potentiometer enables the operator of the apparatus to adjust the reference voltage applied to amplifier 357 and thereby alter the power applied in heating each product P during a heating cycle. It will be obvious therefore that this potentiometer is adjustable to alter as desired the cooking temperautre to which the product is heated.

PRODUCT SURFACE TREATMENT ASSEMBLY C

As shown in FIGURE 1 the products ejected through ejection port 175 are received on a roller conveyor 400. This conveyor extends laterally away from the machine from an end support 401. The conveyor is formed by link chains 402 having connected therebetween rollers 403. The structure of this conveyor is shown in FIGURES 30 and 31.

The products P carried away from the machine on conveyor 400 are supported between adjacent rollers 403. The upper run of the conveyor passes above a support table 405 which has mounted thereabove a plate 406. Heaters 407 are secured by members 408 to the upper surface of plate 406 to heat the plate for surface treatment of products passing thereunder on conveyor 400. The under surface of plate 406 is spaced above the rollers 403 of the conveyor so that the products P are urged into frictional rolling engagement with the undersurface of the plate. Thus, as the conveyor carries the products beneath heated plate 406 they are subjected to a rolling action where the heat of plate 406 serves to impart desired color and a smooth skin surface to the exterior of the product. Preferably the heating of plate 406 by heaters 407 is carefully controlled to maintain uniform temperature for the plate in the order of between 150° F. and 170° F.

As desired in conjunction with the rolling surface treatment, drying air, either heated or unheated, or with or without smoke content may be directed across the products P to impart to them a desired skin surface and/or smoky taste. Also color dye may be sprayed on the products to enhance the surface color. Thereafter, the products may be passed through a chilling station where their temperature is reduced to about 50° F., whereupon they can be carried directly to a suitable packaging machine.

We claim:

1. Apparatus for rapid recurrent production of cooked meat products such as sausages comprising a tubular mold, recurrently operative means for feeding raw material whose conductivity increases with temperature into said mold, electric potential means for heating the mold contents to a cooking temperature by direct electrical conduction longitudinally therethrough, means for ejecting the cooked material from said mold, and means operative immediately prior to the subsequent operation of the first recited means to refill the said mold to cool the entire mold cavity with a cooling liquid.

2. The combination of claim 1 further including liquid supply means for the last recited means operative to supply liquid thereto at a temperature to cool the mold to substantially the raw material temperature.

3. The combination of claim 2 further including raw material supply means operative to deliver chilled raw material to the feeding means.

4. The combination of claim 1 further including means for retaining the cooked product in the mold a substantial predetermined time much longer than the heating period prior to operation of the ejecting means.

5. Apparatus for use in rapid production of cooked meat products such as sausages comprising a movable tubular mold slidably engaging a relatively stationary plate in sealing relation therewith, means for successively positioning the mold recurrently in a series of stations, means for feeding raw material whose conductivity increases with temperature through the plate into the mold in one station, electric potential means for heating the mold contents to a cooking temperature in a proximate subsequent station by direct electrical conduction longitudinally therethrough, means for ejecting the cooked material from the mold through said plate at a subsequent station, and means for cooling the entire mold cavity with a cooling liquid delivered into said mold through said plate immediately prior to repositioning the mold in said one station for refilling.

6. The combination of claim 5 wherein the means for positioning the mold provides a multiplicity of holding stations between the heating station and the subsequent ejecting station.

7. The combination of claim 6 wherein the means for positioning the mold comprises a rotatable turret carrying the mold, and further including plunger means slidably cooperating with the interior of the mold, cylinder means carried by the turret slidably cooperating with the end of the plunger means opposite the mold to provide a fluid receiving chamber, control means connected to control application of fluid pressure to the chamber when the mold is in each station operative to pressurize the chamber during heating operation of the electric potential means.

8. The combination of claim 7 wherein the control means further comprises means operative to pressurize the chamber when the mold is in a plurality of holding stations.

9. The combination of claim 7 further comprising a first electrode mounted within the mold on the end of the plunger means and a second electrode carried by the plate for engagement with the mold contents during heating operation of the electric potential means, said electrodes being energizable by the electric potential means.

10. The combination of claim 9 wherein the electric potential means comprises timer means operative to control the duration of electrical conduction in accordance with the power required to raise the volume of raw material within the mold to the desired cooking temperature.

References Cited by the Examiner

UNITED STATES PATENTS

| | | | |
|---|---|---|---|
| 944,714 | 6/11 | Boyle. | |
| 2,155,316 | 4/39 | Lauterbach | 18—20 |
| 2,830,323 | 4/58 | Krebs et al. | 18—20 |
| 2,839,667 | 6/58 | Cannella | 240—37 X |
| 2,877,118 | 3/59 | Hensgen et al. | 99—358 X |
| 2,897,745 | 8/59 | Nichols et al. | 99—427 |

EUGENE R. CAPOZIO, *Primary Examiner.*

JEROME SCHNALL, *Examiner.*